US010939467B2

(12) United States Patent
Bendigeri et al.

(10) Patent No.: US 10,939,467 B2
(45) Date of Patent: Mar. 2, 2021

(54) METHOD AND APPARATUS FOR INTELLIGENT SCHEDULING OF NETWORK EVALUATION IN WIRELESS LAN NETWORKS

(71) Applicant: Dell Products, LP, Round Rock, TX (US)

(72) Inventors: Udaya Bendigeri, Austin, TX (US); Kamal J. Koshy, Austin, TX (US); I-Ping Yen, Georgetown, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 16/368,726

(22) Filed: Mar. 28, 2019

(65) Prior Publication Data

US 2020/0314897 A1  Oct. 1, 2020

(51) Int. Cl.
*H04W 48/20* (2009.01)
*H04W 74/08* (2009.01)
(Continued)

(52) U.S. Cl.
CPC ....... *H04W 74/0808* (2013.01); *H04W 48/16* (2013.01); *H04W 72/1231* (2013.01); *H04W 76/10* (2018.02); *H04W 84/12* (2013.01)

(58) Field of Classification Search
CPC ............. H04W 74/08; H04W 52/0216; H04W 52/325; H04W 56/0045; H04W 72/048; H04W 72/14; H04W 74/004; H04W 24/08; H04L 63/029; H04L 65/4084; H04L 67/02; H04L 67/06; H04L 67/2838; H04L 67/32;
(Continued)

(56) References Cited

U.S. PATENT DOCUMENTS 9,326,230 B2 * 4/2016 Homchaudhuri ..... H04W 48/20
2004/0039817 A1 * 2/2004 Lee ....................... H04W 24/00
709/225
(Continued)

*Primary Examiner* — Phuc H Tran
(74) *Attorney, Agent, or Firm* — Prol Intellectual Property Law, PLLC; H. Kenneth Prol

(57) ABSTRACT

An information handling system comprising a wireless interface for transmitting a data frame via a wireless link in a wireless neighborhood having a plurality of wireless base transceiver stations (BTSs), a plurality of antenna systems operating via the wireless interface executing code instructions for a carrier sense multiple access (CSMA) media access control protocol employing back-off time periods to avoid packet collision, a radio scanning modem for scanning a plurality of radio channels for the BTSs operating in the wireless neighborhood during a tune out time upon detection of carrier frequency operation by a carrier sense mechanism indicating transmission on the wireless link from another device and ending at a next distributed inter-frame space period of the CSMA protocol, a processor implementing a network evaluation scheduling system for detecting a BTS load for each detected BTS system operating in the wireless neighborhood and determining alternative wireless links with alternative BTSs based on BTS traffic load, and the wireless interface transmitting a data frame upon expiration of a back-off period assigned to the information handling system and detection of no carrier frequency by the carrier sense mechanism.

20 Claims, 9 Drawing Sheets

(51) Int. Cl.
*H04W 72/12* (2009.01)
*H04W 76/10* (2018.01)
*H04W 48/16* (2009.01)
*H04W 84/12* (2009.01)

(58) Field of Classification Search
CPC . H04L 43/0876; H04L 5/0055; H04L 5/0062; H04L 41/5019; H04L 41/5022; H04L 43/0847; H04L 43/0894; H04L 43/16
See application file for complete search history.

(56) References Cited

U.S. PATENT DOCUMENTS

| | | | |
|---|---|---|---|
| 2008/0014934 A1* | 1/2008 | Balasubramanian | ........................ H04W 48/16 455/434 |
| 2016/0234792 A1* | 8/2016 | Zhuang | ............... H04W 52/243 |
| 2017/0150520 A1* | 5/2017 | Soder | .................. H04W 74/002 |
| 2019/0007856 A1* | 1/2019 | Desai | .................... H04W 24/10 |

* cited by examiner

METHOD AND APPARATUS FOR INTELLIGENT SCHEDULING OF NETWORK EVALUATION IN WIRELESS LAN NETWORKS

FIELD OF THE DISCLOSURE

The present disclosure generally relates to a method and apparatus for an intelligent wireless network evaluation scheduling system to efficiently evaluate available base transceiver stations of a wireless network having multiple access by a plurality of user information handling systems on one or more of the available base transceiver stations.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, and networking systems. Information handling systems can also implement various virtualized architectures. Data communications among information handling systems may be via networks that are wired, wireless, optical or some combination. Information handling systems may operate as base transceiver stations (BTSs) to provide wireless communications for a wireless network. For example, BTSs may include access points in a wireless local area network (WLAN). Users may choose from among several available BTSs and even among various radiofrequency communication platforms in information handling systems for data and other communications with other users via communication and data networks. Selection of BTSs may be made on a variety of criteria including availability, proximity, and quality of service criteria.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

DETAILED DESCRIPTION OF THE DRAWINGS

Figure 1:
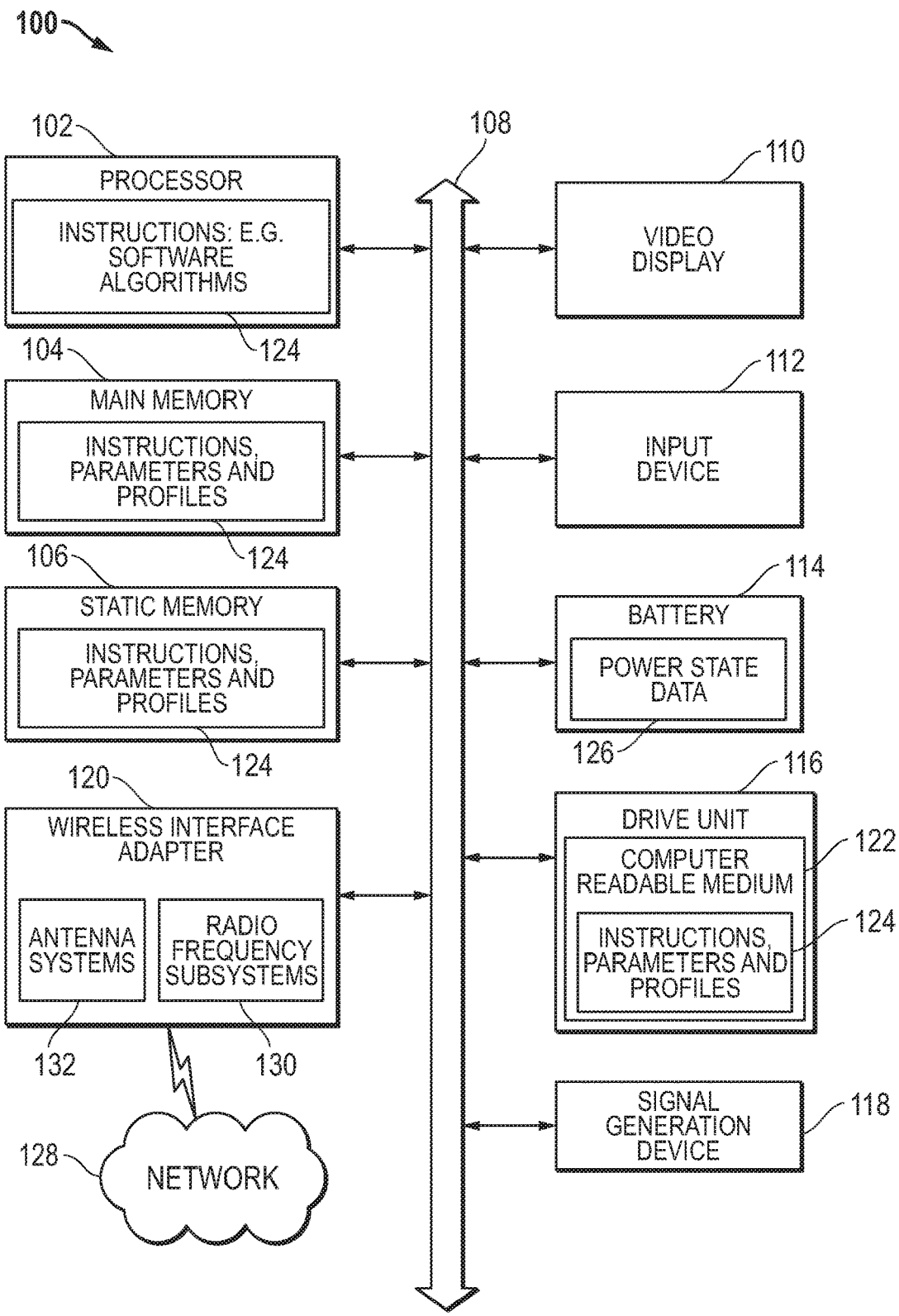
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), a base transceiver station or any other suitable device, and can vary in size, shape, performance, price, and functionality. The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems. The information may include any machine capable of executing a set of instructions (sequential or otherwise) that specify actions to be taken by that machine. In a particular embodiment, the computer system can be implemented using electronic devices that provide voice, video or data communication. Further, while a single information handling system is illustrated in some figures herein, the term "system" shall also be taken to include any collection of systems or sub-systems that individually or jointly execute a set, or multiple sets, of instructions to perform one or more computer functions.

In many environments, a plurality of wireless BTSs, such as access points for WLANs, may be available. For example, in enterprise environments or public locations with wireless network availability many access points may be available to user client information handling systems within range of a plurality of access points. Additionally, many home environments now deploy co-existing network access points. In some examples, home environments or other environments may even include multiple access points having the same set service identifier (SSID) for example. Risk of interference or collision increases with the existence of plural BTSs in an environment within range of multiple client user information handling systems seeking to access a wireless network.

In many systems, network selection by clients may be made based on several key performance indicators (KPIs) including based on received signal strength indicator (RSSI) levels. RSSI may indicate power strength of received signals from access points within range. This may increase, for example, due to proximity to the BTS antenna or power utilized by a BTS for transmission. Other selection criteria may include other quality of service (QoS) key performance indicator criteria. Selection of access points by clients based on RSSI or other reported QoS indicators, for example, may lead to client systems in a wireless range vicinity of a high-RSSI access point access point to crowd onto the same access point. The result may be channel overloading or interference with other client users at the selected wireless access point when other options with less load limitations and better data traffic levels may be available. Congestion may cause transmission delay, consumption of additional power, or other issues. Indications of better data traffic conditions may be determined from any number of wireless key performance indicators (KPIs). These may include wireless condition KPIs in some embodiments. In other embodiments, KPIs for data throughput, load, latency, types of clients (e.g., IEEE 802.11 a/c/d/n or other), and BTS capabilities to handle traffic may be used to determine data traffic levels or capabilities of one or more BTS systems in a neighborhood.

When multiple client information handling systems are accessing a single access point or other type of BTS, scheduling techniques are deployed to help minimize collisions and interference. For example, carrier sense multiple access (CSMA) media access control protocols may be implemented to minimize collisions and interference by requiring transmitting (and receiving) client information handling systems to verify the absence of other traffic before transmitting on a shared transmission medium such as within a wireless transmission band. Several examples of CSMA may be deployed including CSMA with collision detection (CSMA/CD), CSMA with collision avoidance (CSMA/CA), and including several variations of these.

In an example embodiment, CSMA/CA may be utilized with WLAN networks such as IEEE 802.11 Wi-Fi network systems operating with multiple client access attempts. Many client information handling system may even each include a plurality of antenna systems for increased transmission and reception bandwidth when accessing a wireless network. Arbitration of transmissions from the plurality of client information handling systems operating access links to a BTS, such as a Wi-Fi access point, may depend on each client information handling system seeking to transmit on a shared wireless link waiting until it verifies that no transmission is currently occurring on the wireless link. Each client information handling system may utilize a carrier sense mechanism for detecting a carrier frequency operating in the band of the wireless link intended for transmission. When a carrier frequency is detected, it indicates a transmission is in progress from another client node in the wireless network. If no transmission is occurring upon verification attempt of absence of transmissions, the client information handling system may proceed to transmit a signal and messages on the wireless link to the BTS. Further details of the arbitration of shared radiofrequency medium to a BTS may include random assignment of back-off times to multiple client information handling systems such that attempts to transmit do not occur simultaneously by plural client information handling systems waiting to transmit. Assignment of back off times may occur via a randomization algorithm according to various CSMA protocols. If two client information handling systems are inadvertently assigned the same back-off time, the system may trigger an error and require a reset. Additionally, CSMA protocols may include a distributed inter-frame space (DIFS) or period indicating the end of a transmission of a frame from a client information handling system and that channel will be clear.

As described further below, in Wi-Fi network systems, multiple client access attempts may be made to the same access point or other BTS. Management of these multiple access attempts involves the CSMA-CA access management with assigned back-off times to each radio attempting an access. The DIFS indicates when a selected radio has finished transmission. While other radios are transmitting to a Wi-Fi access point or other base station type, and during the DIFS period, each of the remaining radios on information handling systems will await a clear wireless link channel. Then selection of the next radio to transmit a data frame occurs upon expiration of the next-shortest back off period for one of the wireless client information handling systems. This assumes, in some embodiments, that no two radios have been assigned the same back off period duration randomly such that a collision occurs.

When each of the other radios on information handling systems are not transmitting and awaiting clearance to transmit, this period may be referred to tune out time. Disclosures of the present embodiment relate to utilization of this tune out time for scanning wireless radio link conditions for the radio of an information handling system. The Wi-Fi network systems operating with multiple client access attempts may be experiencing congestion despite very good or relatively good wireless conditions for one access point or BTS in example embodiments. The intelligent wireless network evaluation scheduling system of embodiments of the present disclosure utilizes radiofrequency communications hardware to evaluate wireless BTSs in an area during tune out time. In particular embodiments, one or more radios or antenna systems may be operable on an information handling system. During data frame transmission, both antennas and radios may be utilized to increase bandwidth available for transmission. As described in embodiments herein, the intelligent wireless network evaluation scheduling system may vary the attribution of those radiofrequency communications resources to evaluate other wireless BTSs during the tune out times. This eliminates a need for an additional antenna for scanning. For example, during a tune out time, the antennas may be directed to scan nearby BTSs for congestion and QoS aspects for various KPIs and return to listening for channel clearance after a tune out time. In other embodiments, one or more mixers may be deployed to pull one or both antennas and radios systems to evaluate other BTS systems for potential wireless links and congestion. For example, one set of radio and antenna hardware may be entirely dedicated for scanning nearby BTSs via a mixer while another antenna continues listening for a pause in transmission via the carrier sense mechanism.

Further, as wireless technologies blur across WLAN (such as Wi-Fi) with various emerging 5G radio interfaces, multiple radio solutions across a shared communication frequency band may become more available that will enable multiple connections including always-connected platforms. As part of this development, silicon integration provides for multiple radio protocol technologies to be used by a mobile information handling system operating in a wireless environment. For example, WLAN and WWAN communication across heterogeneous networks operating concurrently will require intelligent schedule to minimize packet collisions and performance. With emerging 5G technologies and existing previous technologies, local wireless networks in a variety of WWAN protocols including WWAN technologies in microwave, cm/mm wave, and mm wave communication frequency bands. Examples of protocols in such WWAN technologies include LTE microwave WWAN, LTE cm/mm wave WWAN, and WiGig (mm wave) among others. Further, additional radios may be available on mobile information handling systems for communication within local wireless network neighborhoods. Some of these technologies may be same-band operation technologies. For example, low power wireless area network (LPWAN) protocols LoRaWAN, LTE-MTC, NarrowBand IoT, UNB, Sigfox, Haystack and other protocols may operate within a shared band. WLAN and small cell, unlicensed WWAN may operate in some shared bands in another example.

FIG. 1 shows an information handling system 100 capable of administering each of the specific embodiments of the present disclosure. The information handling system 100 can represent the wireless communication devices 210, 220, and 230, base transceiver stations 241, 242 258, 259, 260 and 270 or other transceivers, or servers or systems 290 located anywhere within network depicted in FIG. 2, including the remote data center 286 operating as a virtual machine for applications described herein. One or more BTSs 241 may establish a plurality of WLAN resources for a plurality of competing wireless communication devices 210, 220, and 230 for access to wireless network 240. Information handling system 100 may operate as a base transceiver device in some embodiments of the present disclosure. Additionally, information handling system 100 may represent a wireless communication device associated with a user or recipient of intended wireless communication.

Information handling systems such as a base transceiver device or other networked system may execute code instructions for an intelligent wireless network evaluation scheduling system that utilizes onboard radiofrequency communications hardware to evaluate wireless BTSs according to embodiments of the present disclosure. A wireless communication device may execute instructions via a processor for the intelligent wireless network evaluation scheduling system to scan utilizing one or more antenna systems and radio frequency front ends, carrier sense mechanisms to detect congestion, tunable radio systems, and a mixer system. The mixer may provide for flexibility of multiple antenna utilization for BTS scanning according to additional embodiments disclosed herein. The intelligent wireless network evaluation scheduling system may operate, in whole or in part, on a client wireless information handling system in some embodiments. In other embodiments, some portion may operate on a base transceiver station or interface with remote data centers 286 or servers 290 such as in FIG. 2.

The information handling system 100 may include a processor 102 such as a central processing unit (CPU), a graphics processing unit (GPU), or both. Moreover, the information handling system 100 can include a main memory 104 and a static memory 106 that can communicate with each other via a bus 108. As shown, the information handling system 100 may further include a video display unit 110, such as a liquid crystal display (LCD), an organic light emitting diode (OLED), a flat panel display, a solid state display, or display device. Display 110 may include a touch screen display module and touch screen controller (not shown) for receiving user inputs to the information handling system 100. Additionally, the information handling system 100 may include an input device 112, such as a keyboard, and a cursor control device, such as a mouse or touchpad or similar peripheral input device. The information handling system may include a power source such as battery 114 or an A/C power source. The information handling system 100 can also include a disk drive unit 116, and a signal generation device 118, such as a speaker or remote control. The information handling system 100 can include a network interface device such as a wireless adapter 120. The information handling system 100 may represent a client wireless device such as a desktop personal computer, a laptop computer, a tablet computer, or a mobile smart phone in some embodiments. The information handling system 100 can also represent a server device whose resources can be shared by multiple client devices. In some aspects, such as a base transceiver station, may not include some or more aspects of the information handling system as described. For example, a base transceiver station may not include a video display device 110 in an example embodiment.

The information handling system 100 can include a set of instructions 124 that can be executed to cause the computer system to perform any one or more of the methods or computer based functions disclosed herein. For example, instructions 124 may execute an intelligent wireless network evaluation scheduling system, software agents, or other aspects or components of various embodiments herein. Similarly, instructions 124 may be execute control over RF frequency subsystems 130 and antenna systems 132 to scan and evaluate local BTS systems for wireless QoS metrics of KPIs such as congestion in a wireless neighborhood operating a plurality of wireless links and resources.

In some aspects, instructions 124 may execute the intelligent wireless network evaluation scheduling system for the purposes of assessing and selecting alternative wireless links with alternative BTSs when thresholds of QoS performance for KPIs are met and congestion levels are detected as improved at the alternative BTS in some embodiments. Instructions 124 may also include aspects of the intelligent wireless network evaluation scheduling system to schedule BTS evaluation during one or more tune out times of the wireless information handling system. In other aspects instructions 124 may execute algorithms, such as CSMA-CA to regulate transmission or reception along the wireless channels made available or selected via the intelligent wireless network evaluation scheduling system according to those protocols.

Various software modules comprising application instructions 124 may be coordinated by an operating system (OS) and via an application programming interface (API). An example operating system may include Windows®, Android®, and other OS types known in the art. Example APIs may include Win 32, Core Java API, or Android APIs. In a further example, processor 102 may conduct monitoring and processing of wireless communication device usage trends by the information handling system 100 according to the systems and methods disclosed herein. The computer system 100 may operate as a standalone device or may be connected such as using a network, to other computer systems or peripheral devices. In a networked deployment, the information handling system 100 may operate in the capacity of a server or as a client user computer in a server-client user network environment, or as a peer computer system in a peer-to-peer (or distributed) network environment.

The disk drive unit 116 may include a computer-readable medium 122 in which one or more sets of instructions 124 such as software can be embedded. Similarly, main memory 104 and static memory 106 may also contain computer-readable medium for storage of one or more sets of instructions, parameters, or profiles 124. The disk drive unit 116 and static memory 106 also contains space for data storage. Further, the instructions 124 may embody one or more of the methods or logic as described herein. For example, instructions relating to the intelligent wireless network evaluation scheduling system may be stored here. Scanned load or other data traffic indicators relating to transceivers scanned during tune out time periods may also be stored here in main memory 104, static memory 106, drive unit 116, or remotely via network 128 in some embodiments. Additionally, wireless communication monitoring data for QoS metrics of KPIs including packet delay, throughput and other aspects of radio resource management may be stored in various memory types. Wireless link profiles stored here may include end-user profile data measured by the processor 102 during wireless link usage and may be utilized in selection of alternative BTSs according to some embodiments herein. Profiles, in some embodiments, may additionally include crowd sourced spatial-temporal radio frequency profiles for wireless links or for energy link consumption data.

The network interface device shown as wireless adapter 120 can provide connectivity to a network 128, e.g., a wide area network (WAN), a local area network (LAN), wireless local area network (WLAN), a wireless personal area network (WPAN), low power wireless area network (LPWAN), a wireless wide area network (WWAN), or other network. The wireless adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. Wireless adapter 120 may connect to any combination of macro-cellular wireless connections including 2G, 2.5G, 3G, 4G, 5G or the like from one or more service providers. The wireless adapter 120 can represent an add-in card, wireless network interface module that is integrated with a main board of the information handling system or integrated with another wireless network interface capability, or any combination thereof. In an embodiment the wireless adapter 120 may include one or more radio frequency subsystems 130 including transmitters and wireless controllers for connecting via a multitude of wireless links. In an example embodiment, an information handling system may have an antenna system transmitter 132 for 5G small cell WWAN, Wi-Fi WLAN, LPWAN, or WiGig connectivity and one or more additional antenna system transmitters 132 for macro-cellular communication. The radio frequency subsystems 130 include wireless controllers to manage authentication, connectivity, communications, power levels for transmission, buffering, error correction, baseband processing, and other functions of the wireless adapter 120.

Further, wireless adapter 120 may be tuned to scan with one or more RF antenna systems and utilizing portion of the radio frequency subsystems including mixers to vary times when one or more antennas may be utilized for scanning versus carrier sensing to detect busy wireless communication links according to some embodiments. Connectivity may be via wired or wireless connection in whole or in parts in some embodiments for communication with remote servers or other resources. Wireless adapter 120 may include one or more radio frequency subsystems 130 with transmitter/receiver circuitry, wireless controller circuitry, tuners, amplifiers, mixers, scanning capability, QoS metric detection for KPIs, and other circuitry for wireless communications or BTS assessment.

One or more radiofrequency subsystems 130 may communicate with one or more wireless technology protocols in licensed or unlicensed spectrum some embodiments. For example, the radiofrequency subsystem 130 may contain individual subscriber identity module (SIM) profiles for each technology service provider and their available protocols. Alternatively, it may have a software based SIM profile that is reconfigurable. In yet another aspect, the radiofrequency subsystem may include an eSIM for electronic control over activate SIM profile being used depending on assessment of various BTS systems.

The wireless adapter 120 may also include antenna system 132 which may be tunable antenna systems for use with the system and methods disclosed herein. Further, radio frequency subsystem 130 may be a scanning radio frequency subsystem that may be capable of scanning among a plurality of channels in one or more radio frequency communication bands according to embodiments herein for assessment of a plurality BTSs such as Wi-Fi access points available in a wireless neighborhood. For example, a wireless adapter 120 may scan and listen via one or more antenna systems to determine BTS data traffic levels from KPIs including load, throughput, latency, or airtime usage of nearby BTSs within wireless range of a wireless neighborhood. Additional considerations of BTS data traffic levels includes types of clients and capabilities of BTSs to handle traffic. In another example, the wireless controller of a radio frequency subsystem 130 may manage detecting and measuring QoS metrics for various KPIs such as received signal strength indicator (RSSI) levels, bit error rates, signal to noise ratios, latencies, jitter, and other metrics relating to signal quality and strength for the base transceiver system.

In one embodiment, a wireless controller may manage one or more radio frequency subsystems 130 within a wireless adapter 120.

Battery 114 may include a smart battery system that tracks and provides power state data 126. This power state data may be stored with the instructions, parameters, and profiles 124 to be used with the systems and methods disclosed herein in some embodiments as well. The wireless controller of a wireless adapter 120 may also manage transmission power levels which directly affect wireless adapter power consumption. Such information may be used with power state data 126 in some aspects. To detect and measure power consumption by a radio frequency subsystem 130, the radio frequency subsystem 130 may implement current and voltage measurements of power that is directed to operate a radio frequency subsystem. The voltage and current provides power measurement in milliwatts. Energy consumed may be calculated from sample measurements by taking average power measured over a duration of transmission. In an alternative embodiment of power measurement, counter registers may be used to estimate power consumed during transmissions. Energy measurement may be a sampled during a count cycle. In this case, a sample energy measurement per count is multiplied into a count for operation of a radio subsystem. In this way, power consumption may be estimated in an example embodiment.

In some aspects of the present disclosure, one wireless adapter 120 may operate two or more wireless links. In one aspect, wireless adapter 120 may operate two or more wireless links in a similar communication frequency band according to a similar wireless protocol such as Wi-Fi for additional communication bandwidth. Assessment of other BTSs operating the similar wireless protocol may be scanned and assessed by one or both tunable antennas according to embodiments herein.

In other aspects, wireless adapters 120 may operate two or more wireless links in a plurality of separate communication frequency bands. Those frequency bands may be under a variety of protocols and may reside in licensed or unlicensed frequency spectrum. A wireless neighborhood may have a variety of wireless link protocols operating at a location or locations. Further, a plurality of the wireless link protocols may operate within a shared communication frequency band. In a further aspect, the wireless adapter 120 may operate the two or more wireless links with a single, shared communication frequency band.

The wireless network 128 may have a wireless mesh architecture in accordance with mesh networks described by the wireless data communications standards or similar standards. The wireless adapter 120 may also connect to the external network via a WPAN, WLAN, WWAN, LPWAN or similar wireless switched Ethernet connection. The wireless data communication standards set forth protocols for communications and routing via access points, as well as protocols for a variety of other operations. Other operations may include handoff of client devices moving between nodes, self-organizing of routing operations, or self-healing architectures in case of interruption.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions, parameters, and profiles 124 or receives and executes instructions, parameters, and profiles 124 responsive to a propagated signal; so that a device connected to a network 128 can communicate voice, video or data over the network 128. Further, the instructions 124 may be transmitted or received over the network 128 via the network interface device or wireless adapter 120.

Information handling system 100 includes one or more application programs 124, and Basic Input/Output System and firmware (BIOS/FW) code 124. BIOS/FW code 124 functions to initialize information handling system 100 on power up, to launch an operating system, and to manage input and output interactions between the operating system and the other elements of information handling system 100. In a particular embodiment, BIOS/FW code 124 reside in memory 104, and include machine-executable code that is executed by processor 102 to perform various functions of information handling system 100. In another embodiment (not illustrated), application programs and BIOS/FW code reside in another storage medium of information handling system 100. For example, application programs and BIOS/FW code can reside in drive 116, in a ROM (not illustrated) associated with information handling system 100, in an option-ROM (not illustrated) associated with various devices of information handling system 100, in storage system 107, in a storage system (not illustrated) associated with network channel of a wireless adapter 120, in another storage medium of information handling system 100, or a combination thereof. Application programs 124 and BIOS/FW code 124 can each be implemented as single programs, or as separate programs carrying out the various features as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium.

Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Figure 2:
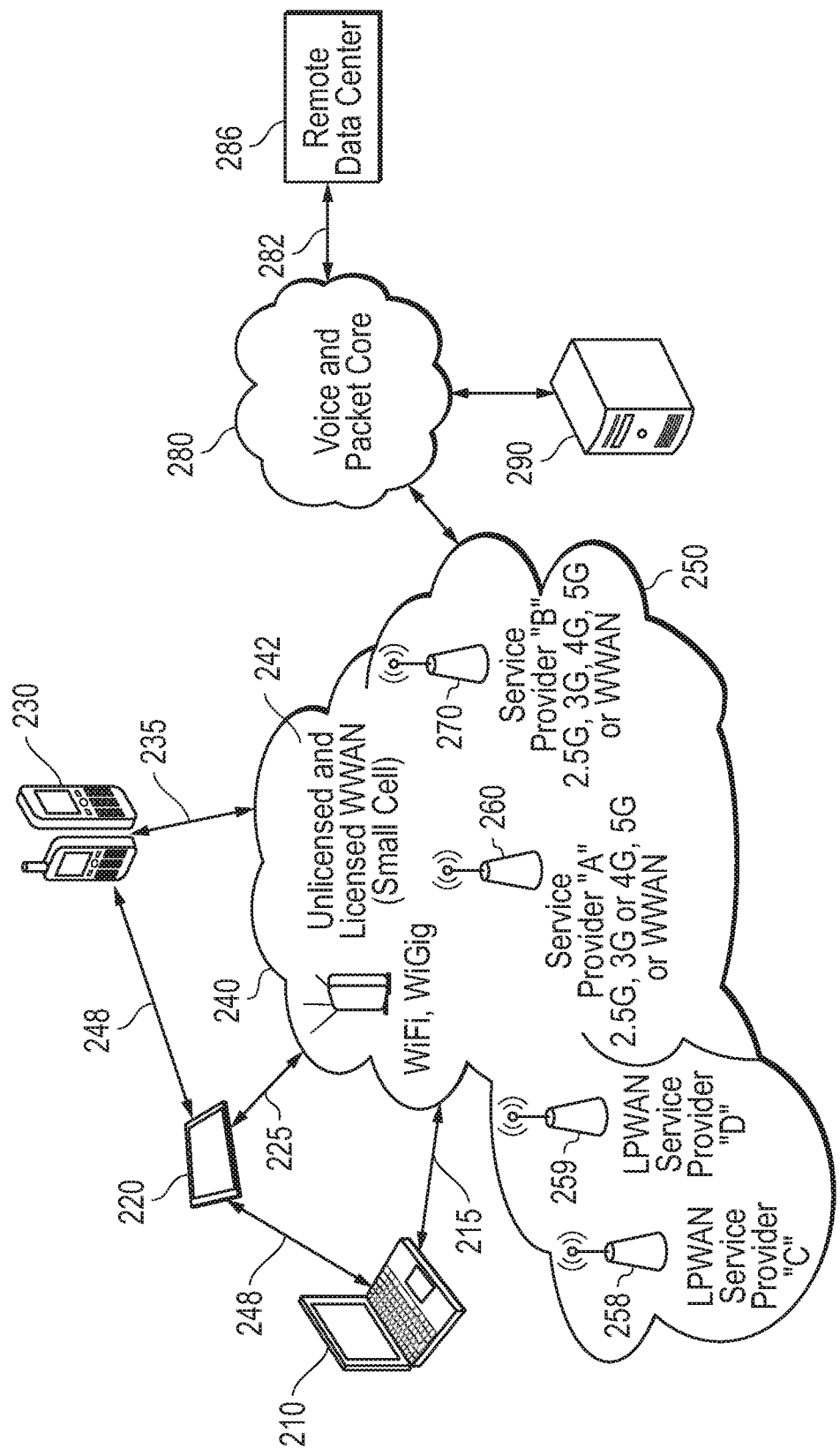
FIG. 2 is a block diagram of a network environment and wireless communication devices according to an embodiment of the present disclosure.

FIG. 2 illustrates a network 200 that can include one or more information handling systems. In a particular embodiment, network 200 includes networked wireless communication devices 210, 220, and 230, wireless network access points, and multiple wireless connection link options. A variety of additional computing resources of network 200 may include client mobile information handling systems, data processing servers 290, network storage devices, local and wide area networks, or other resources as needed or desired. As specifically depicted, systems 210, 220, and 230 may be a laptop computer, tablet computer, or smartphone device. These wireless communication devices 210, 220, and 230, may access a wireless local network 240, or they may access a macro-cellular network 250. Each wireless communication system 210, 220, and 230 may implement one or a plurality of wireless links such as depicted with 215, 225, and 235 with the wireless local network 240 or macro-cellular network 250. Plural wireless links or aggregated wireless links may be used with a single wireless protocol or plural wireless links may be established with several wireless protocols by each wireless communication system 210, 220, and 230 in various embodiments herein.

For example, the wireless local network 240 may include one or more wireless local area network (WLAN) 241 BTSs such as an access point, a wireless personal area network (WPAN), low power wireless area network (LPWAN), or a wireless wide area network (WWAN). In an example embodiment, LTE-LAA, or emerging 5G WWAN may operate with one or more small-cell WWAN wireless BTS options 242 with a supplemental unlicensed small cell WWAN wireless link option as well. In this example embodiment, the licensed LTE-LAA WWAN wireless link and the unlicensed small cell WWAN supplemental link may operate in different communication frequency bands. Similar arrangements for emerging 5G and other upcoming protocols are similarly contemplated in some embodiments. For example, emerging 5G may include small cell WWAN data on a licensed band as well as small cell WWAN on an unlicensed band.

In yet other embodiments, LPWAN systems such as LPWAN 258 from service provider "C" and LPWAN 259 from service provider "D" may operate on shared communication frequency bands in some example embodiments such as ISM bands. Other examples of competing protocols operating on shared communication frequency bands are also contemplated and discussed in embodiments herein.

Since WPAN or Wi-Fi Direct Connection 248 and WWAN networks 242 can functionally operate similar to WLANs, they may be considered as wireless local area networks (WLANs) for purposes herein. Components of a WLAN or other local wireless network 240 may be connected by wireline or Ethernet connections to a wider external network. For example, wireless network access points may be connected to a wireless network controller and an Ethernet switch. Wireless communications across wireless local network 240 may be via standard protocols such as IEEE 802.11 Wi-Fi, IEEE 802.11ad WiGig, IEEE 802.15 WPAN, or emerging 5G small cell WWAN communications such as eNodeB, or similar wireless network protocols. Alternatively, other available wireless links within network 200 may include macro-cellular connections 250 via one or more service providers 260 and 270. Service provider macro-cellular connections may include 2G standards such as GSM, 2.5G standards such as GSM EDGE and GPRS, 3G standards such as W-CDMA/UMTS and CDMA 2000, 4G standards, or emerging 5G standards including WiMAX, LTE, and LTE Advanced, LTE-LAA, small cell WWAN, and the like.

Wireless local network 240 and macro-cellular network 250 may include a variety of licensed, unlicensed or shared communication frequency bands as well as a variety of wireless protocol technologies ranging from those operating in macrocells, small cells, picocells, or femtocells.

In some embodiments according to the present disclosure, a networked wireless communication device 210, 220, or 230 may have a plurality wireless network interface systems capable of transmitting simultaneously within a shared communication frequency band. That communication within a shared communication frequency band may be sourced from different protocols on parallel wireless network interface systems or from a single wireless network interface system capable of transmitting and receiving from multiple protocols. Similarly, a single antenna or plural antennas may be used on each of the wireless communication devices for aggregated communications on a single protocol, across several protocols, or some combination. Example competing protocols may be local wireless network access protocols such as Wi-Fi, WiGig, and small cell WLAN in an unlicensed, shared communication frequency band. Example communication frequency bands may include unlicensed 5 GHz frequency bands or 3.5 GHz conditional shared communication frequency bands under FCC Part 96. Wi-Fi ISM frequency bands that could be subject to future sharing include 2.4 GHz, 60 GHz, 900 MHz or similar bands as understood by those of skill in the art. Within local portion of wireless network 250 access points for Wi-Fi or WiGig as well as small cell WWAN connectivity may be available in emerging 5G technology.

There may be issues with selection of optimal wireless links when concurrent communication from multiple wireless access information handling systems 210, 220, and 230 occurs on individual wireless protocols. For example, WLAN access may involve congestion when one particular BTS is deemed to have the best wireless conditions for operation. For example, when multiple mobile information handling systems such as 210, 220, or 230 enter a wireless neighborhood each attempting to select the optimal wireless link option, limited information may be available to assist in selecting wireless links with optimized quality and limited loading, cost, or power consumption without an ability to scan for congestion and conditions at several BTS options. Such issues may be addressed or mitigated with remedies according to the intelligent wireless network evaluation scheduling system according to embodiments herein.

Wireless local network 240 and macro-cellular network 250 may be operatively connected to voice and packet core network 280. The voice and packet core network 280 may contain externally accessible computing resources and connect to a remote data center 286. The voice and packet core network 280 may contain multiple intermediate web servers or other locations with accessible data (not shown). The voice and packet core network 280 may also connect to other wireless networks similar to 240 or 250 and additional wireless communication devices such as 210, 220, 230 or similar connected to those additional wireless networks. Connection 282 between the wireless network 240 and remote data center 286 or connection to other additional wireless networks may be via Ethernet or another similar connection to the world-wide-web, a WAN, a LAN, another WLAN, or other network structure. Such a connection 282 may be made via a WLAN access point/Ethernet switch to the external network and be a backhaul connection. The access point may be connected to one or more wireless access points in the WLAN before connecting directly to a wireless communication device or may connect directly to one or more wireless communication devices 210, 220, and 230. Alternatively, wireless communication devices 210, 220, and 230 may connect to the external network via base station locations at service providers such as 260 and 270. These service provider locations may be network connected via backhaul connectivity through the voice and packet core network 280.

Remote data center 286 may include web servers or resources within a cloud environment. For example, remote data centers can include additional information handling systems, data processing servers, network storage devices, local and wide area networks, or other resources as needed or desired. Having such remote capabilities may permit fewer resources to be maintained at the wireless communication devices 210, 220, and 230 allowing streamlining and efficiency within those devices. Similarly, remote data center 286 permits fewer resources to be maintained in other parts of network 200. In an example embodiment, the cloud or remote data center 286 or networked server 290 may run hosted applications for systems 210, 220, and 230. For example, remote data center 286, networked server 290, or some combination of both may operate some portion of the intelligent wireless network evaluation scheduling system or the CSMA protocol described in some embodiments of the present disclosure. In other embodiments, the intelligent wireless network evaluation scheduling system may operate on wireless communication devices 210, 220, and 230. Wireless communication devices 210, 220, and 230 are adapted to run one or more applications locally, and to have hosted applications run in association with the local applications at remote data center 286 or networked server 290.

The connection QoS and speed of wireless links 215, 225, and 235 may vary widely depending on several factors including the service provider bandwidth, the number of wireless communication devices and users in a location, and other factors. Quality of service impacts energy consumption and efficiency of a wireless communication device communicating wirelessly. Thus, selection of a wireless link may depend on assessment of the link radio frequency conditions. Assessment of link radio frequency conditions may be made via the scanning assessment of BTS systems, such as alternative Wi-Fi access points which may have QoS levels of one or more KPIs similar to an optimally selected Wi-Fi access point but which may be substantially less congested. The intelligent wireless network evaluation scheduling system may be utilized with on-board radio frequency resources of wireless access information handling systems such as 210, 220, and 230 to assess congestion and QoS conditions for KPIs during tune out times. The antenna systems of those wireless adapters may also operate to provide transmission and reception activity for wireless data. Thus, an additional scanning antenna may not be needed.

The intelligent wireless network evaluation scheduling system frees up one or more antenna systems of the wireless access devices 210, 220, and 230 for assessing BTS data traffic levels, such as load, for a wireless neighborhood and QoS aspects for one or more KPIs of other available wireless links to BTSs not currently being accessed for data transmission. Radio frequency conditions for wireless links will evolve over time. Data traffic levels may change over time on various base transceiver systems. Differences in wireless link QoS or efficiency will also vary minute-by-minute, hourly, daily, weekly or monthly or during even longer periods. Thus, assessment may need to be regular. Scanning the neighborhood base transceiver station systems for data traffic levels and other KPIs may be conducted periodically for a wireless neighborhood to assist congestion alleviation. BTS data traffic levels, for example, may be determined from load, throughput, latency, airtime usage, type of client operating a WLAN, or data capacity of particular BTSs.

Increased traffic levels or loads on a BTS may slow down the wireless links to that BTS in comparison to another BTS with similar QoS levels for one or more KPIs but with less active traffic for example. This may also cause greater energy consumption for transmission on a congested wireless link. Factors impacting energy consumption include switching and signaling during communication access, setup, and authentication. Additional factors that impact energy consumption include control communications, latencies, transmission/reception, and switching for the wireless link. As described above, these factors can be specific to the type of wireless service being requested, whether voice, messaging, SMTP, Audio, Video, HTTP or other service types. It can also be specific to the wireless communication device used. Certain protocols may not be available on some mobile information handling systems. In each instance, radio frequency transmission subsystems and controllers operate and consume device power. Based on these numerous factors, the system of the present embodiment may automatically switch between BTS options or even between radio network technologies or service providers to optimize radio frequency conditions, traffic conditions, device power consumption, cost, or any of the above. Selection of an alternative BTS must maintain a threshold level of QoS for one or more KPIs, such as radio conditions, and may also generally depend on the optimal wireless technology used for a service requested, the radio frequency conditions of a link, traffic conditions for the wireless link, and availability of a link.

Figure 3:
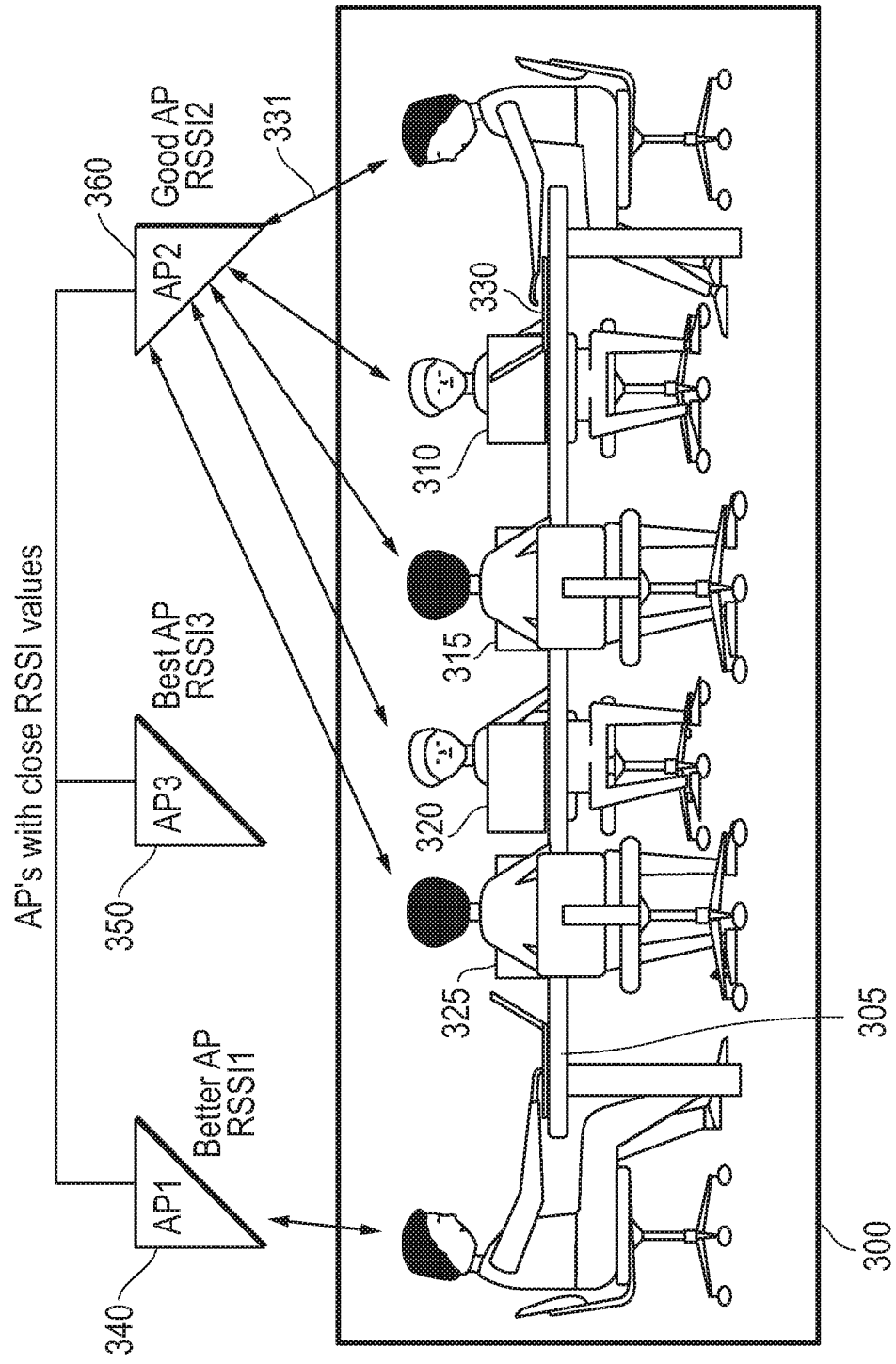
FIG. 3 is a block diagram illustrating an example wireless network with a plurality of wireless access BTSs available to a plurality of information handling systems according to an embodiment of the present disclosure.

FIG. 3 illustrates a wireless neighborhood 300 with a plurality of BTSs 340, 350, and 360 as well as a plurality of wireless information handling systems in an example embodiment. The wireless neighborhood 300 may be a contained space such as a conference room or a wider space such as a building, campus, shopping area, airport, or other area having a plurality of competing wireless link options available for several wireless information handling systems. In some aspects, the wireless neighborhood 300 may be facilities or a campus associated with an enterprise, military, university, government or municipal organization. Within the wireless neighborhood 300 there are a plurality of base transceiver systems (BTSs) including several access points (APs) including AP1 340, AP2 360, and AP3 350. The BTSs 340, 350, and 360 within wireless neighborhood 300 are within range of a plurality of client wireless information handling systems 305, 310, 315, 320, 325, and 330. Each wireless information handling system 305, 310, 315, 320, 325, and 330 may obtain access to a BTS such as AP1 340, AP2 360, and AP3 350 to establish a wireless link.

As shown, each of the access points, AP1 340, AP2 360, and AP3 350, have a record of one or more QoS metrics for KPIs associated with it. For example, in the shown embodiment, relative RSSI levels may be associated with each of AP1 340, AP2 360, and AP3 350. Although the RSSI metrics associated with each of AP1 340, AP2 360, and AP3 350 may be similar quality of signal levels, a majority of the several wireless information handling systems may select just one BTS. As can be seen, it may occur that a majority of wireless information handling system clients 305, 310, 315, 320, 325, and 330 may choose to access a single BTS such as AP2 360, while other available BTSs such as AP1 340 and AP3 350 have few or no client wireless devices linked. This may occur for a number of reasons. For example, reported RSSI2 at AP2 360 may be reported or scanned to be best and optimization systems may select AP2 360 on that basis. In other embodiments, AP2 360 may simply be the closest BTS to most client wireless linked information handling systems 310, 315, 320, 325, and 330. In other aspects, AP2 360 may be the first selectable BTS in the vicinity listed when users select a BTS or may have been older and pre-linked for a majority of the client wireless linked information handling systems 310, 315, 320, 325, and 330.

As a result, AP 3 350 may in fact be the best wireless link option because there is no congestion and it has a sufficient RSSI or other QoS signal capacity meeting KPI criteria, but for any of a variety of reasons most clients have selected a different BTS. Similarly, AP1 340, may be a better option than AP2 360 because only one wireless client information handlings system 305 is accessing that BTS.

The intelligent wireless network evaluation scheduling system of various embodiments herein frees up one or more antenna systems of the wireless access devices 305, 310, 315, 320, 325, and 330. For example, while wireless access device 310 is experiencing tune out time while waiting to communicate with AP 2 360, the intelligent wireless network evaluation scheduling system in various embodiments herein may provide for one or both antenna systems to scan other BTSs in the wireless neighborhood 300 such as AP1 340 and AP3 350 for congestion and QoS metrics for one or more KPIs. With this information, the intelligent wireless network evaluation scheduling system may recommend or automatically switch to a better BTS option such as AP1 340 or AP3 350 in the wireless neighborhood 300. In this way, the intelligent wireless network evaluation scheduling system may be used to alleviate the congestion experienced by wireless access device 310 with wireless linkage to AP2 360. Any or all wireless access devices 305-330 may utilize an intelligent wireless network evaluation scheduling system to scan and determine if BTSs with better congestion levels and sufficient QoS levels are available. The intelligent wireless network evaluation scheduling system provides for this capability while continuing wireless data transmission with the currently-linked BTS. Further description of embodiments are found herein.

Figure 4A:
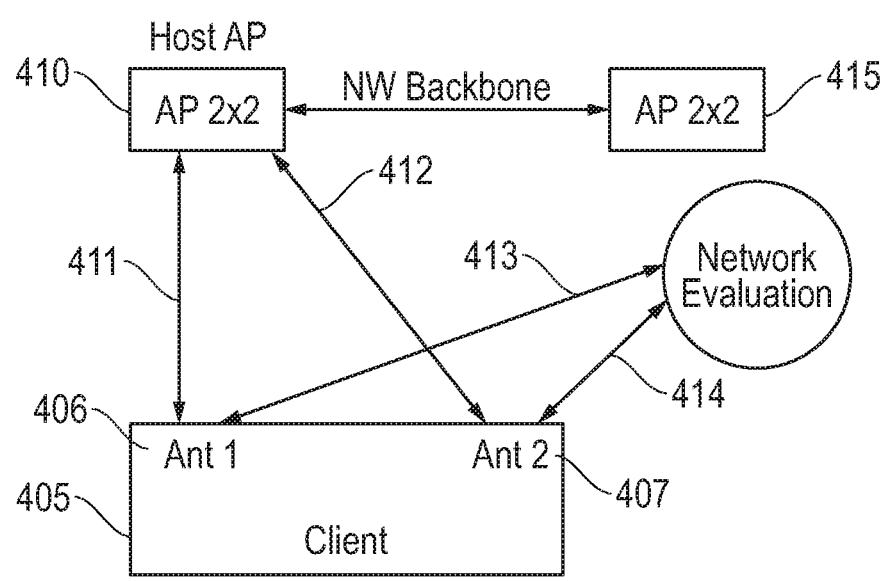
FIG. 4A is a block diagram illustrating an intelligent wireless network evaluation scheduling system utilizing radiofrequency communications hardware to evaluate wireless BTSs according to an embodiment of the present disclosure.

FIG. 4A illustrates an example embodiment of a client wireless information handling system 405 interfacing with a BTS such as Host AP 410. In the example embodiment of FIG. 4A, client wireless information handling system 405 has plural antenna systems Ant 1 406 and Ant 2 407. Although two antenna systems are shown, it is understood that any plurality of antenna systems are contemplated with the embodiments herein.

Three mechanisms may be illustrated in embodiments herein although variations are contemplated. Comparison may be made among FIGS. 4A, 6A, and 6B in some example embodiments. Table 1 below shows detail of operation of the mechanism of FIG. 4A according to one example embodiment.

TABLE 1

| Hardware | Tune out time | Latency/Throughput Loss |
| --- | --- | --- |
| Antenna 1: monitor current channel then switch to network evaluation during tune-out | Back-off freeze to end of defer period | Minimal, no loss observed. |
| Antenna 2: monitor current channel then switch to network evaluation during tune-out | Back-off freeze to end of defer period | Minimal, no loss observed. |

In the example embodiment, Ant 1 406 and Ant 2 407 are both linked via wireless links 411 and 412 respectively. The plurality of wireless links 411 and 412 provide for additional bandwidth and throughput for client information handling system 405. As depicted, a wireless neighborhood may include multiple access points including AP 410 and a second AP 415. AP 410 and AP 415 may be operatively coupled via network backbone in some embodiments. FIG. 4A further shows the ability of the intelligent wireless network evaluation scheduling system to divert Ant 2 407 and Ant 1 406 or neither to scan and determine if any alternative BTSs in the wireless neighborhood have sufficient QoS levels for one or more KPIs and to assess congestion at those BTSs. In this particular embodiment of FIG. 4A, it is contemplated that a single mixer (not shown) may be part of client 405 and operate between both antennas Ant 1 406 and Ant 2 407. In other variations on the embodiment of FIG. 4A, a single mixer may divert only Ant 2 407 or only Ant 1 406 for intelligent scanning. A single mixer may be a cost efficient design choice for use with client 405. In other embodiments as discussed herein, multiple mixers may be used for each of Ant 1 406 and Ant 2 407 such that either or both may be diverted under some circumstances. During tune out time, the intelligent wireless network evaluation scheduling system may schedule one or both Ant 2 407 and Ant 1 406 to conduct wireless network evaluation via 413 and 414 respectively.

In particular, the embodiment of FIG. 4A shows both Ant 2 407 and Ant 1 406 diverted to conduct evaluation of alternate BTSs, such as AP 415, in the wireless neighborhood. Client wireless information handling system 405 may include a radio scanning modem connected to one or both of Ant 2 407 and Ant 1 406. The intelligent wireless network evaluation scheduling system may scan BTS occupancy levels including current BTS data traffic capacities and also determine channel by channel BTS QoS metrics for alternate BTS systems according to some embodiments herein. The radio scanning modem may be instructed to scan each channel for BTS system activity among each of the shared communication frequency bands. Scanning may be conducted for radios conditions as well as BTS data traffic levels determined from load, throughput, latency, or airtime usage. Additional determination may be made of client types affecting data throughput consumption or airtime bandwidth consumption as well as BTS data handling capabilities which may vary among BTSs.

Figure 4B:
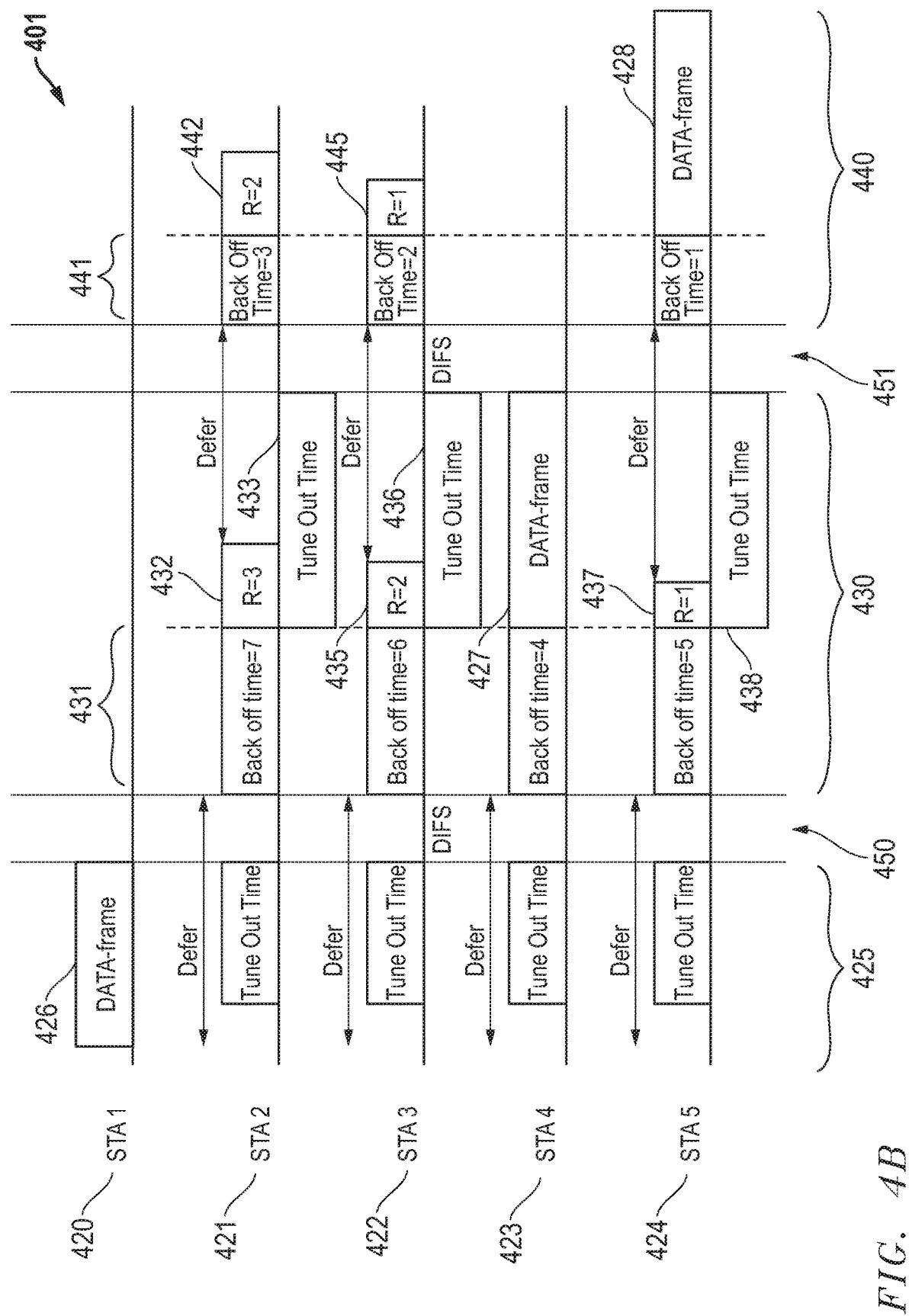
FIG. 4B is a graphical diagram illustrating carrier sense multiple access (CSMA) media access control protocol timing chart illustrating tune out time to evaluate wireless BTSs according to an embodiment of the present disclosure.

FIG. 4B shows a CSMA media access control protocol timing chart illustrating tune out times which may be used to evaluate wireless BTSs according to an embodiment. Shown is an example time chart for a CSMA arbitration for access to transmit data frames wirelessly by a plurality of wireless information handling systems. In the example embodiment, five information handling systems are shown as STA1 420, STA2 421, STA3 422, STA4 423, and STA5

424. It is contemplated and any number of wireless information handling systems may be linked to a single BTS and be required to utilize the CSMA-CA 802.11 protocol to avoid collision and order data frame communications with the BTS.

In the first frame period 425, it may be seen that STA1 420 may transmit data frame 426 while STA2 421, STA3 422, STA4 423, and STA5 424 all defer to STA1 420. The deferral period may be designated for STA2 421, STA3 422, STA4 423, and STA5 424 as a tune out time while STA 1 420 transmits data frame 426. The deferral of STA2 421, STA3 422, STA4 423, and STA5 424 also extends to the first distributed inter-frame space (DIFS) 450 that is a standard amount of time that must occur between frame time periods when transmissions occur with a BTS. DIFS 450 occurs after the first frame period 425.

Upon commencement of the second data frame period 430 as shown, each of STA2 421, STA3 422, STA4 423, and STA5 424 have been assigned random back off times designated as 431. The back off time period 431 begins after the DIFS 450. Back off time period 431 counts down until the client wireless information handling system with the remaining shortest randomly assigned back off time expires. In this case, STA4 423 has the shortest randomly assigned back off period of 4 in an example embodiment. The remainder values for each information handling system, such as 4 for STA4 423, are designated values to show relative length between the assigned remainders. Units are not included but may be in 10s or 100s of μs in some example embodiments. Once 4 has expired during the back off period 431, STA4 423 transmits data frame 427. Transmission of data frame 427 may be conducted without risk of collision with other wireless information handling systems STA1 420, STA2 421, STA3 422, and STA5 424 unless two wireless information handling systems have been assigned the same back off time. However, assignment of the same back off time is among two wireless information handling systems is unlikely, but if it occurs it would trigger an error and reset under CSMA protocols.

The other wireless information handling systems STA2 421, STA3 422, and STA5 424 will have remainder back of times of R=3 at 432, R=2 at 435, and R=1 at 437 which will be carried forward to the next frame time period 440. Upon commencement of transmission of data frame 427 by STA4 423, then STA2 421, STA3 422, and STA5 424 enter tune out times 433, 436 and 438 respectively during the period of transmission of data frame 427. STA2 421, STA3 422, and STA5 424 will defer through the next DIFS 451.

At the next data frame time period 440, the remainder back off times will apply at 441. Other stations may try to access the BTS to transmit data frames and may be assigned new back off times as well. However, the wireless information handling system with the shortest remainder of back off time (or newly assigned back off time) will proceed to next transmit a data frame. In the shown example embodiment, STA 5 424 has the shortest remainder back off time of 1 during 441 after which it will transmit data frame 428 to the BTS. Wireless information handling systems STA2 421 and STA 3 422 will have remainder back off times of R=3 at 442 and R=2 at 445 respectively. These remainder back off times 442 and 443 will be carried forward to the next data frame time period (not shown) along with any newly assigned random back off times for systems attempting to transmit data frames. The sequence continues as described. In various embodiments described herein, the tune out times 433, 436, and 438 shown in data frame time period 430 may be used by STA2 421, STA3 422, and STA5 424 respectively to scan other BTS systems for congestion and QoS metrics for one or more KPIs. Further description may be found herein.

Figure 5:
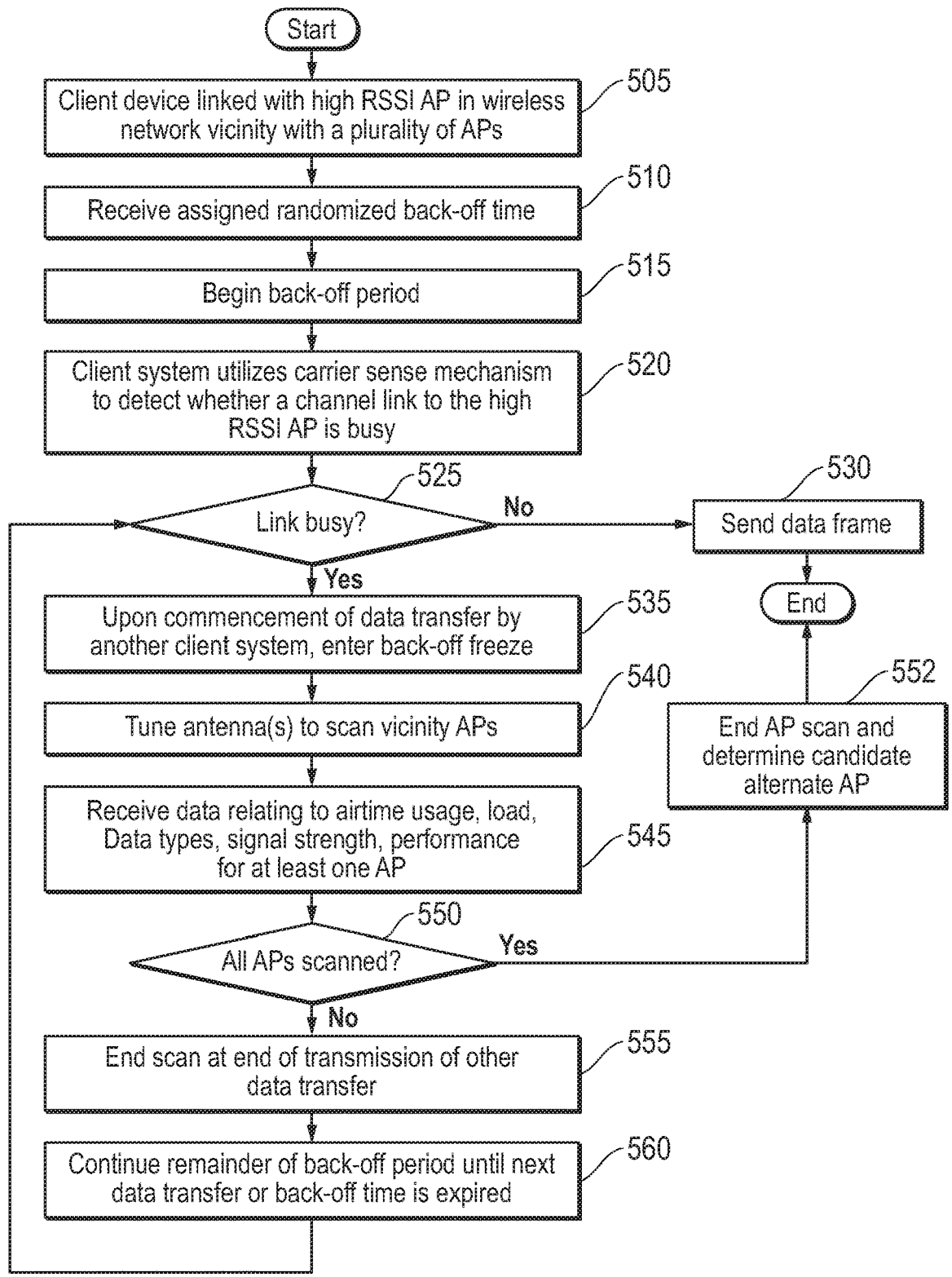
FIG. 5 is a flow diagram illustrating a method of evaluating wireless network BTSs with an intelligent wireless network evaluation scheduling system according to an embodiment of the present disclosure.

FIG. 5 illustrates a method for execution of code instructions for an intelligent wireless network evaluation scheduling system according to an embodiment herein. The method starts at 505, where at least one client wireless information handling system links with a BTS, such as a Wi-Fi access point, having a high RSSI level. In some embodiments, the selected BTS may have the highest RSSI in one example. At 505, a plurality of other client wireless information handling systems may also link with the same BTS on the basis of the high RSSI value in the example embodiment. In an embodiment, this may cause congestion at the selected BTS with the high RSSI level. In embodiments herein, a plurality of alternative BTSs, such as a plurality of Wi-Fi access points, may be in the wireless neighborhood of the at least one client wireless information handling system. In other words, a plurality of BTSs may be within range of the at least one client wireless information handling system. The intelligent wireless network evaluation scheduling system and intelligent background scanning for evaluation of other BTSs may not occur unless congestion is experienced with the selected BTS above. Upon experiencing congestion, back off and defer periods provide the opportunity for the intelligent wireless network evaluation scheduling system to scan and evaluate other neighborhood BTSs according to embodiments herein. As such, the intelligent wireless network evaluation scheduling system may continue to implement evaluation of wireless neighborhood BTSs in real time when congestion is experienced at the currently selected BTS. Real time data may change constantly with respect to conditions or available BTSs in a wireless neighborhood. Accordingly, the intelligent wireless network evaluation scheduling system may dynamically continue seeking improved BTS options when congestion is encountered on a selected BTS wireless link.

Proceeding to 510, the CSMA-CA IEEE 802.11 protocol may assign a random back-off time if one is not already assigned. The CSMA-CA protocol may assign additional random back off times to other client wireless information handling systems accessing the selected BTS in the wireless neighborhood. In an embodiment, any collision caused by identically-assigned random back off periods will trigger an error and reset of assignment of random back off periods. For purposes of this discussion, it is assumed that no identical random back off periods have been assigned. The intelligent wireless network evaluation scheduling system and intelligent background scanning for evaluation of other BTSs may not occur unless congestion is experienced with the selected BTS above. Upon experiencing congestion, back off and defer periods provide the opportunity for the intelligent wireless network evaluation scheduling system to scan and evaluate other neighborhood BTSs according to embodiments herein. As such, the intelligent wireless network evaluation scheduling system may continue to implement evaluation of wireless neighborhood BTSs in real time when congestion is experienced.

The back off time period will begin at 515. As described above with reference to FIG. 4B, the random back off period begins after the last DIFS period after the data frame period previous to the present data frame period.

At 520, as the back off time period passes, the at least one client information handling system will utilize a carrier sense mechanism via one or more antennas located thereon to detect whether the channel link is busy to the selected high RSSI BTS.

Flow proceeds to 525 where the intelligent wireless network evaluation scheduling system determines whether the channel link to the selected high RSSI BTS is occupied. As the data frame time periods progress for the selected BTS, if the at least one client wireless information handling system having intelligent wireless network evaluation scheduling capability does have the shortest back off time assigned, then the wireless link will not be occupied before the expiration of the back off time. Flow proceeds to 530 where the at least one client wireless information handling system will have had the shortest remaining back off time and will begin transmitting the data frame. At that point, the flow may end.

As the data frame time periods progress for the selected BTS, if the at least one client wireless information handling system does not have the shortest back off time assigned at 525, then the channel link with the selected high RSSI BTS will be occupied at some point before the back off time expires. That indicates that one of the other client wireless information handling systems accessing the selected high RSSI BTS had a shorter back off time assigned. Then that client wireless information handling system becomes a transmitting client device for the next data frame transmission on the channel link to the selected high RSSI BTS.

Flow then proceeds to 535. At 535, upon commencement of data frame transfer on the channel link with the selected BTS by another client device, the at least one client information handling system enters a back-off freeze period during which the back off time remainder is deferred to the next data frame time period. The at least one client information handling system defers the channel link to the selected high RSSI BTS to the transmitting client device. At this point, the at least one client information handling system enters a tune out time upon the commencement of the back-off freeze.

At 540, the intelligent wireless network evaluation scheduling system determines the tune out time and directs the antennas of the at least one client wireless information handing system to scan vicinity BTSs. A scanning modem is utilized to link the plural antenna systems to scan area BTS systems channel by channel.

At 545, the intelligent wireless network evaluation scheduling system conducting the scans of area BTSs in the wireless neighborhood receives data relating to congestion and QoS metrics of KPIs for channels to link with those alternate BTSs. For example, scans may provide data relating to load, signal strength, jitter, throughput, latency, or other QoS metrics of KPIs in some embodiments. In other examples, airtime usage, data types transferred, BTS performance, available channels, conflicting bands in the area, and other information related to each BTS evaluated may be determined.

Flow may proceed to 550 where the intelligent wireless network evaluation scheduling system will determine if all potential alternative BTSs in the wireless neighborhood have been evaluated. If so, flow may proceed to 552. If not, additional scanning will be conducted as flow proceeds to 555.

When all potential alternative BTSs within scanning range of the wireless adapter of the at least one information handling system, flow proceeds to 552 where scanning ends. The intelligent wireless network evaluation scheduling system may then determine from among the alternative candidate BTS systems which may provide the lowest congestion or provide a combination of best QoS connection with low congestion. The intelligent wireless network evaluation scheduling system may upon such a basis select an alternative candidate BTS as a better option than the currently-selected high RSSI BTS. In one embodiment, the options of one or more alternative candidate BTS systems may be presented to a user via a display screen option suggesting a change in BTS. For example, a user interface window may pop-up recommending a change. In another embodiment, the at least one client wireless information handling system may automatically select the best alternative candidate BTS system and switch wireless linking to that alternative. For example, if the signal strength or other QoS level for one or more KPIs is above a threshold level for an alternative candidate BTS, a low congestion option may be selected and the wireless link switched there. In other embodiments, a blend of QoS level and low congestion level may be used to select the alternative BTS for establishing a new wireless link. At this point, the flow may end. It is contemplated that the method to conduct scanning of FIG. 5 may be used periodically, may be used episodically, or may be used upon some trigger such as detection of delay levels for wireless data transmission.

If all BTSs in a wireless neighborhood have not been scanned at 550, then flow proceeds to 555. At 555, the intelligent wireless network evaluation scheduling system may conduct scanning with the antennas of the at least one client wireless information handling system until the ongoing data transmission of the current data frame period to the selected high-RSSI BTS has ended. Upon commencement of the next DIFS indicating that the ongoing data transmission ended, the tune out time ends and the scanning by the at least one information handling system of other BTSs in the wireless neighborhood will end.

At 560, the CSMA-CA protocol will continue after the next DIFS. After the DIFS, a new back-off period will begin for the next data frame period. Competing client wireless information handling systems seeking to wirelessly transmit data to the selected high-RSSI BTS will continue to countdown their assigned remaining back-off period duration. This back-off period countdown will continue until the next shortest assigned back-off time expires and that client wireless device begins transmission of data to occupy the link. Flow will return to 525 to determine if the wireless link with the selected high-RSSI BTS is busy with another data transmission from a different client wireless device. If the at least one client wireless information handling system operating the intelligent wireless network evaluation scheduling system of the current method has the shortest remaining back-off time, then data transmission will commence at 530. If not, scanning of vicinity BTSs in the wireless neighborhood will continue according to the various embodiments described herein.

Figure 6A:
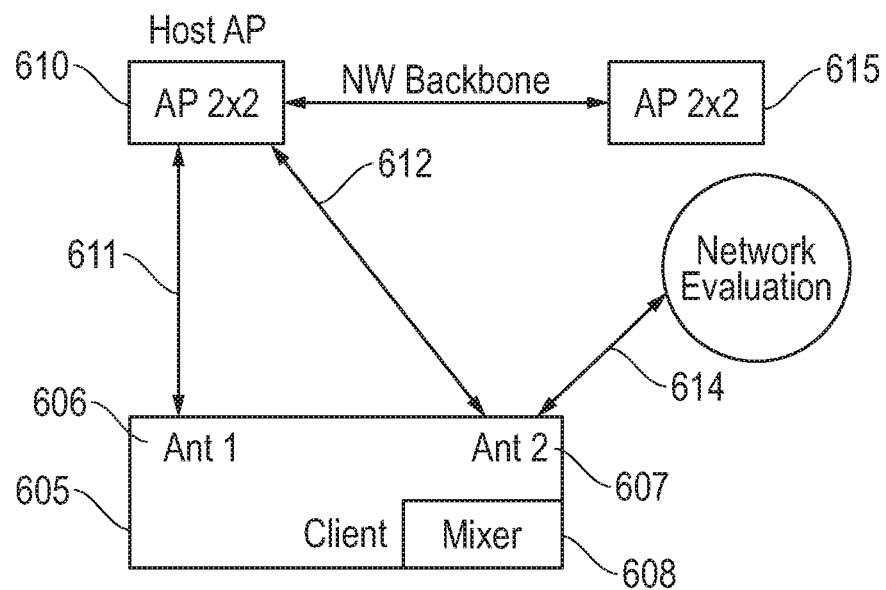
FIG. 6A is a block diagram illustrating an intelligent wireless network evaluation scheduling system utilizing radiofrequency communications hardware to evaluate wireless BTSs according to another embodiment of the present disclosure.

FIG. 6A illustrates another example embodiment of a client wireless information handling system 605 interfacing with a BTS such as Host AP 610. In the example embodiment of FIG. 6A, client wireless information handling system 605 has plural antenna systems Ant 1 606 and Ant 2 607. Additionally, client wireless information handling system 605 has a mixer as with the example embodiment in FIG. 4A and also has an additional mixer 608 which may permit individual operation of antenna chains Ant 1 606 and Ant 2 607. Both mixers, the original mixer (not shown) and additional mixer 608 may be a portion of the radio frequency front end or as any portion of the wireless interface device on the client wireless information handling system 605. Example mixers may comprise a local oscillator such that signal from the local oscillator multiplies with the base band and radio frequency signal to convert the baseband and radio frequency signal to either a higher or lower frequency. The additional mixer 608 may be associated with antenna chain Ant 607 while the original mixer (not shown) may be associate with antenna chain Ant 1 606 such that separate independent operation of Ant 1 606 and Ant 2 607 are available.

Although two antenna systems are shown, it is understood that any plurality of antenna systems are contemplated with the embodiments herein. In the example embodiment, Ant 1 606 and Ant 2 607 are both linked via wireless links 611 and 612 respectively to AP 610 in the wireless neighborhood. The plurality of wireless links 611 and 612 provides for enhanced bandwidth and throughput for client information handling system 605 during transmission or reception of wireless data.

Table 2 below shows detail of operation of the mechanism of FIG. 6A according to one example embodiment herein.

TABLE 2

| Hardware | Tune out time | Latency/Throughput Loss |
| --- | --- | --- |
| Antenna 1: monitor current channel | Continued monitoring | Minimal, no loss observed. |
| Antenna 2: switch to network evaluation during tune-out | Start of back-off to end of defer period | Minimal, no loss observed. |

As depicted, a wireless neighborhood may include multiple access points including AP 610 and a second AP 615. AP 610 and AP 615 may be operatively coupled via network backbone in some embodiments. FIG. 6A further shows the ability of the intelligent wireless network evaluation scheduling system to divert Ant 2 607 to scan and to assess congestion at any alternative BTSs in the wireless neighborhood and determine if those BTSs have sufficient QoS levels for various KPIs. For example, a first KPI may need to meet a threshold level and BTS data traffic levels may be assessed for alternative BTSs on a different KPI. BTS data traffic levels determined from load, throughput, latency, or airtime usage for example. In such an embodiment as shown in FIG. 6A, the mixer provides for flexibility where Ant 2 607 may be directed to AP 610 during transmission or reception of wireless data via 612 along with Ant 1 606 via 611. Additionally, with implementation of mixer 608, Ant 2 607 may be directed to network evaluation via 614 at other times such as designated tune out times. During tune out time, the intelligent wireless network evaluation scheduling system may schedule Ant 2 607 to conduct wireless network evaluation via 614 while Ant 1 606 maintains link 611 to continue to monitor traffic at AP 610 via the carrier sense system.

In particular, the embodiment of FIG. 6A shows Ant 2 607 diverted via a mixer 608 to conduct evaluation of alternate BTSs such as AP 615 in the wireless neighborhood while Ant 1 606 remains linked via 611 with AP 610 during evaluation to continue monitoring the current channel with AP 610. As described above, client wireless information handling system 605 may include a radio scanning modem connected to Ant 2 607 via the mixer. The intelligent wireless network evaluation scheduling system may scan, and according to embodiments herein, determine channel by channel BTS QoS of one or more KPIs such as congestion by wireless neighborhood BTS systems. This information may be gathered about those other BTS systems, including current BTS data traffic capacities, during one or more tune out time periods. The radio scanning modem may be instructed to scan each channel for BTS system activity among each of the shared protocol or among shared communication frequency bands. BTS data traffic levels determined from load, throughput, latency, or airtime usage. Additionally, types of WLAN client or BTS performance capability to manage data levels may be assessed determination of BTS data traffic levels for some embodiments. In yet another aspect, other KPIs may be assessed for impact on BTS data traffic levels.

Figure 6B:
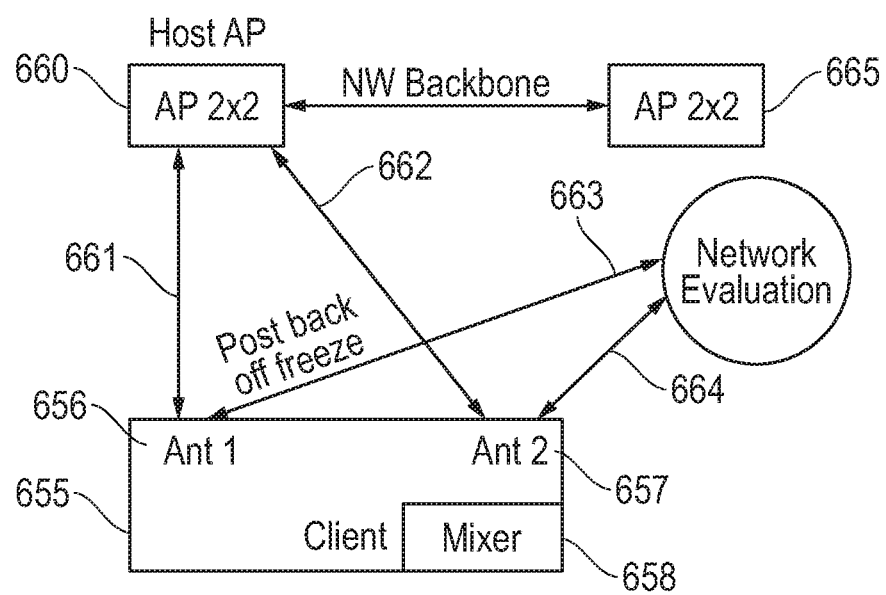
FIG. 6B is a block diagram illustrating an intelligent wireless network evaluation scheduling system utilizing existing radiofrequency hardware to evaluate wireless BTSs according to yet another embodiment of the present disclosure.

FIG. 6B illustrates yet another example embodiment of a client wireless information handling system 655 interfacing with a BTS such as Host AP 660. In the example embodiment of FIG. 6B, client wireless information handling system 655 also has plural antenna systems Ant 1 656 and Ant 2 657. Additionally, client wireless information handling system 655 has an original mixer (not shown) also has an additional mixer 658 which may permit separating operation of Ant 1 656 and Ant 2 657. The original mixer may be a portion of the radio frequency front end or as any portion of the wireless interface device as would be the case on the client wireless information handling system 655. The embodiment of FIG. 6B also shows an additional mixer 658 may be associated with either antenna chain Ant 1 656 or Ant 2 657. Example mixers may include frequency mixers or switching mixers to provide for radio scanning of several frequencies from a radio scanning modem. The additional mixer provides for either antenna chain Ant 1 656 or Ant 2 657 to tune to different frequencies to evaluate BTSs independent from the other antenna chain.

Although two antenna systems are shown, it is understood that any plurality of antenna systems are contemplated with the embodiments herein. In the example embodiment, Ant 1 656 and Ant 2 657 are both linked via wireless links 661 and 662 respectively to AP 660 in the wireless neighborhood. The plurality of wireless links 661 and 662 provides for enhanced bandwidth and throughput for client information handling system 655 during transmission or reception of wireless data.

Table 3 below shows detail of operation of the mechanism of FIG. 6B according to one example embodiment herein.

TABLE 3

| Hardware | Tune out time | Latency/Throughput Loss |
| --- | --- | --- |
| Antenna 1: monitor current channel then switch to network evaluation during first tune-out | First antenna tune-out: Back-off freeze to end of defer period | Minimal, no loss observed. |
| Antenna 2: switch to network evaluation during second tune-out | Second antenna tune-out: Start of back-off to end of defer period | Minimal, no loss observed. |

As depicted, a wireless neighborhood may include multiple access points including AP 660 and a second AP 665. AP 660 and AP 665 may be operatively coupled via network backbone in some embodiments. FIG. 6B further shows the ability of the intelligent wireless network evaluation scheduling system to divert Ant 2 657 to scan and to determine if alternative BTSs have sufficient QoS levels for one or more KPIs. Further the scan may also be conducted to assess congestion at any alternative BTSs in the wireless neighborhood for a different KPI via 664. For example, BTS data traffic levels determined from load, throughput, latency, or airtime usage. Additionally, types of clients or BTS performance capability may be assessed in determining BTS data traffic capacity levels. In such an embodiment as shown in FIG. 6B, the mixer provides for flexibility where Ant 2 657 may be directed to AP 660 during transmission or reception of wireless data via 662 along with Ant 1 656 via 661. With implementation of mixer 658, Ant 2 657 may be directed to network evaluation via 664 at other times such as during a first portion of a designated tune out time while Ant 1 656 may still be required to sense carrier activity for AP 660 via 661. During this first portion of the tune out time, the intelligent wireless network evaluation scheduling system may schedule Ant 2 657 to conduct wireless network evaluation via 664 while Ant 1 656 maintains link 661 to continue to monitor traffic at AP 610 via the carrier sense system.

When the back off freeze has been implemented by the CSMA-CA protocol and no sensing for carrier activity on the link with AP 660 is required, a second portion of the tune out time may occur. In this post-back off freeze period where monitoring the carrier activity of AP 660 is not necessary, the intelligent wireless network evaluation scheduling system may schedule even more resources to evaluating other BTSs in the wireless neighborhood. As shown, the wireless interface and a radio scanning modem may be used and the intelligent wireless network evaluation scheduling system may direct Ant 1 656, in addition to Ant 2 657, to conduct network evaluation during the post-back off freeze as shown. Ant 1 656 may conduct radio scanning of BTSs in the wireless neighborhood via 663 as shown for also conducting network evaluation.

In particular, the embodiment of FIG. 6B shows Ant 2 657 diverted via a mixer 658 to conduct evaluation of alternate BTSs such as AP 665 in the wireless neighborhood while Ant 1 656 remains linked via 661 with AP 660 during a first portion of the tune out time period. As described above, client wireless information handling system 655 may include a radio scanning modem. The separate additional mixer 658 may be connected to Ant 2 657 to allow for Ant 2 657 to tune out and evaluate neighborhood BTSs via the radio scanning modem in search of better wireless link performance separately from Ant 1 656. After a back off freeze, the intelligent wireless network evaluation scheduling system may also divert Ant 1 656 via 663 to conduct network evaluation as well so that both Ant 2 657 and Ant 1 656 may conduct scanning during the second portion of the tune out time period. The intelligent wireless network evaluation scheduling system may attribute additional resources to scan, and according to some embodiments herein, determine channel by channel BTS QoS and occupancy by wireless neighborhood BTS systems. This information may be gathered about those other BTS systems, including current BTS data traffic capacities, during one or more portions of the tune out time periods. The radio scanning modem may be instructed to scan each channel for BTS system activity among each of the shared protocol or among shared communication frequency bands as described in various embodiments herein.

Figure 6C:
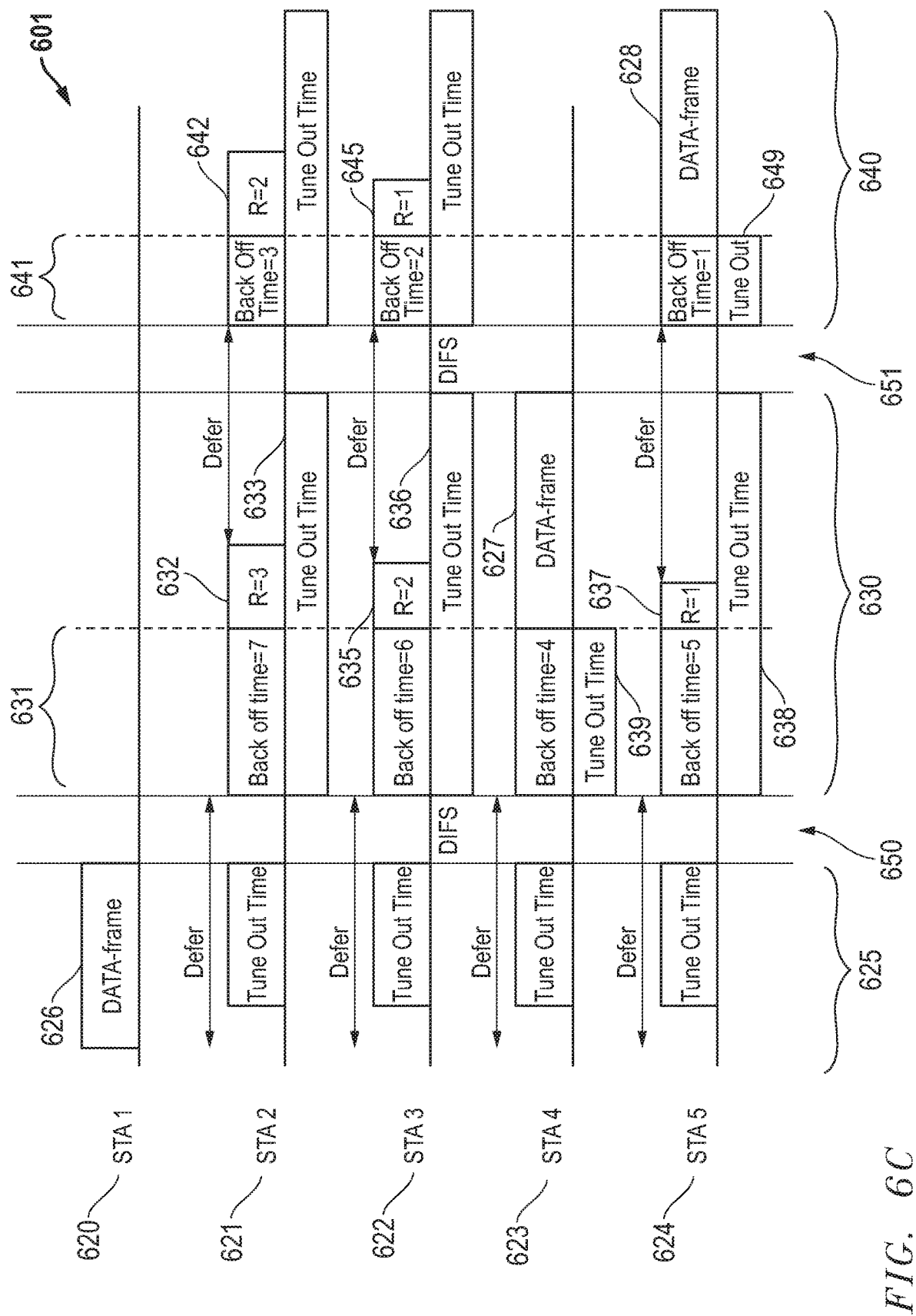
FIG. 6C is a graphical diagram illustrating carrier sense multiple access (CSMA) media access control protocol timing chart illustrating tune out time to evaluate wireless BTSs according to another embodiment of the present disclosure.

FIG. 6C shows a CSMA media access control protocol timing chart illustrating tune out times which may be used to evaluate wireless BTSs according to another embodiment. Shown is another example time chart for a CSMA arbitration for access to transmit data frames wirelessly by a plurality of wireless information handling systems. In the example embodiment, five information handling systems are shown as STA1 620, STA2 621, STA3 622, STA4 623, and STA5 624. It is contemplated and any number of wireless information handling systems may be linked to a single BTS, and be required to utilize the CSMA-CA 802.11 protocol to avoid collision and order data frame communications with the BTS.

In the first frame period 625, it may be seen that STA1 620 may transmit data frame 626. In the first frame period 625, STA2 621, STA3 622, STA4 623, and STA5 624 all defer to STA1 620 which include a tune out time period and a DIFS 650. A portion of the deferral period may be designated for STA2 621, STA3 622, STA4 623, and STA5 624 as the tune out time while STA 1 620 transmits data frame 626. Similar to as describe in FIG. 4B, the DIFS 650 occurs after the first frame period 625 and indicates that the data frame transmission 626 has ended.

Upon commencement of the second frame period 630 as shown, each of STA2 621, STA3 622, STA4 623, and STA5 624 have been assigned random back off times. These may be remainder back off time carried forward or newly assigned. The back off time is shortest for STA4 623. Back off time period 631 commences after DIFS 650 ends. The back off time period 631 lasts until the wireless information handling system with the shortest remaining randomly assigned back off period (or remainder) expires. Namely, STA4 623 in the shown embodiment has the back off time or remainder of 4. The remainder values for each information handling system, such as 4 for STA4 623, are designated values to show relative length between the assigned remainders. Units are not included but may be in 10s or 100s of µs in some example embodiments. Once 4 has expired during the back off period 631, STA4 623 transmits data frame 627.

In the present embodiment, the back off period 631 may also be a tune out time 639 for STA4 623. In other words, the tune out time 639 for STA4 623 is the same duration as the back off time 631 since it is the shortest back off time. During this tune out time 639, STA4 623 may utilize a mixer with the intelligent wireless network evaluation scheduling system to direct at least one antenna, such as the second antenna of a plurality of antennas, to scan other BTSs in the wireless neighborhood. The other antenna, or first antenna, for STA4 623 may continue listening for occupancy of the communication channel with the selected high RSSI BTS. Upon expiration of the back off time 631 of STA4 623, both antennas may be directed to transmission of data frame 627. Thus, transmission of data frame 627 may be conducted without risk of collision with other wireless information handling systems STA1 620, STA2 621, STA3 622, and STA5 624 unless two wireless information handling systems have been assigned the same back off time. However, assignment of the same back off time is unlikely to be identical among two wireless information handling systems.

After the back off time period 631, the other wireless information handling systems STA2 621, STA3 622, and STA5 624 will have remainder back of times of R=3 at 632, R=2 at 635, and R=1 at 637 which will be carried forward to the next data frame time period 640 in an embodiment. Upon commencement of transmission of data frame 627, then STA2 621, STA3 622, and STA5 624 enter a back-off freeze. A second portion of tune out times 633, 636 and 638 respectively continues. Prior to the back off freeze at the end of back off period 631, STA2 621, STA3 622, and STA5 624 may utilize a mixer and intelligent wireless network evaluation scheduling system to direct a second antenna to scan alternate wireless neighborhood BTSs during the first portion of tune out time 633, 636, and 638 respectively if implementing embodiments herein. During this first portion of tune out times 633, 636, and 638, the first antenna of each of STA2 621, STA3 622, and STA5 624 may continue listening for channel occupancy with the selected high RSSI BTS linked for data frame communications.

After the back off freeze, STA2 621, STA3 622, and STA5 624 may then implement the intelligent wireless network evaluation scheduling system to continue to direct at least one antenna, such as the second antenna, to continue scanning alternate BTSs in one embodiment such as shown in FIG. 6A. In another optional embodiment, the intelligent wireless network evaluation scheduling system may also direct the first antenna to scan alternate BTSs after the back off freeze. This latter embodiment is an optional embodiment as shown in FIG. 6B. In the example embodiment, the second portion of the tune out times 633, 636, and 638 for STA2 621, STA3 622, and STA5 624 respectively will include the period of transmission of data frame 627 occurring after the back off freeze. In the example embodiment, the first portion of tune out times 633, 636, and 638 for STA2 621, STA3 622, and STA5 624 respectively will include the back off period 631 prior to the back off freeze. Also, STA4 623 will have only a first portion of a tune out time 639 prior to the back off freeze. Each of STA2 621, STA3 622, STA5 624, as well as STA1 620, will defer through the next DIFS 651.

At the next data frame time period 640, the remainder back off times will apply at back off period 641. Other stations may try to access the BTS to transmit data frames and may be assigned new back off times as well. However, the wireless information handling system with the shortest remainder of back off time will proceed to next transmit a data frame 628. In the shown example embodiment, STA5 624 has the shortest remainder back off time of 1 during 641. After 1, STA5 624 will transmit data frame 628 to the BTS. Wireless information handling systems STA2 621 and 6TA 3 422 will have remainder back off times of R=2 642 and R=1 645 respectively carry forward to the next back off time period. These remainder back off times 642 and 645 will be carried forward to the next data frame time period along with any newly assigned random back off times for systems attempting to transmit data frames. The sequence of frame periods and DIFS periods may continue as described.

In various embodiments described herein, the tune out time 649 shown in back off time period 641 may be used by STA5 624 to scan other BTSs in an embodiment until the next back off freeze is applies and STA5 624 transmits data frame 628. Further, next tune out times for STA2 621, STA3 622 during both the back off time period 641 and during data frame transmission in frame period 640 may be used to scan other BTS systems for congestion and QoS metrics for this and one or more other KPIs. As before, the intelligent wireless network evaluation scheduling system may direct one or plural antennas to conduct scanning of other BTSs as described in various embodiments herein during first and second portions of the tune out periods. Further description may be found herein.

Figure 7:
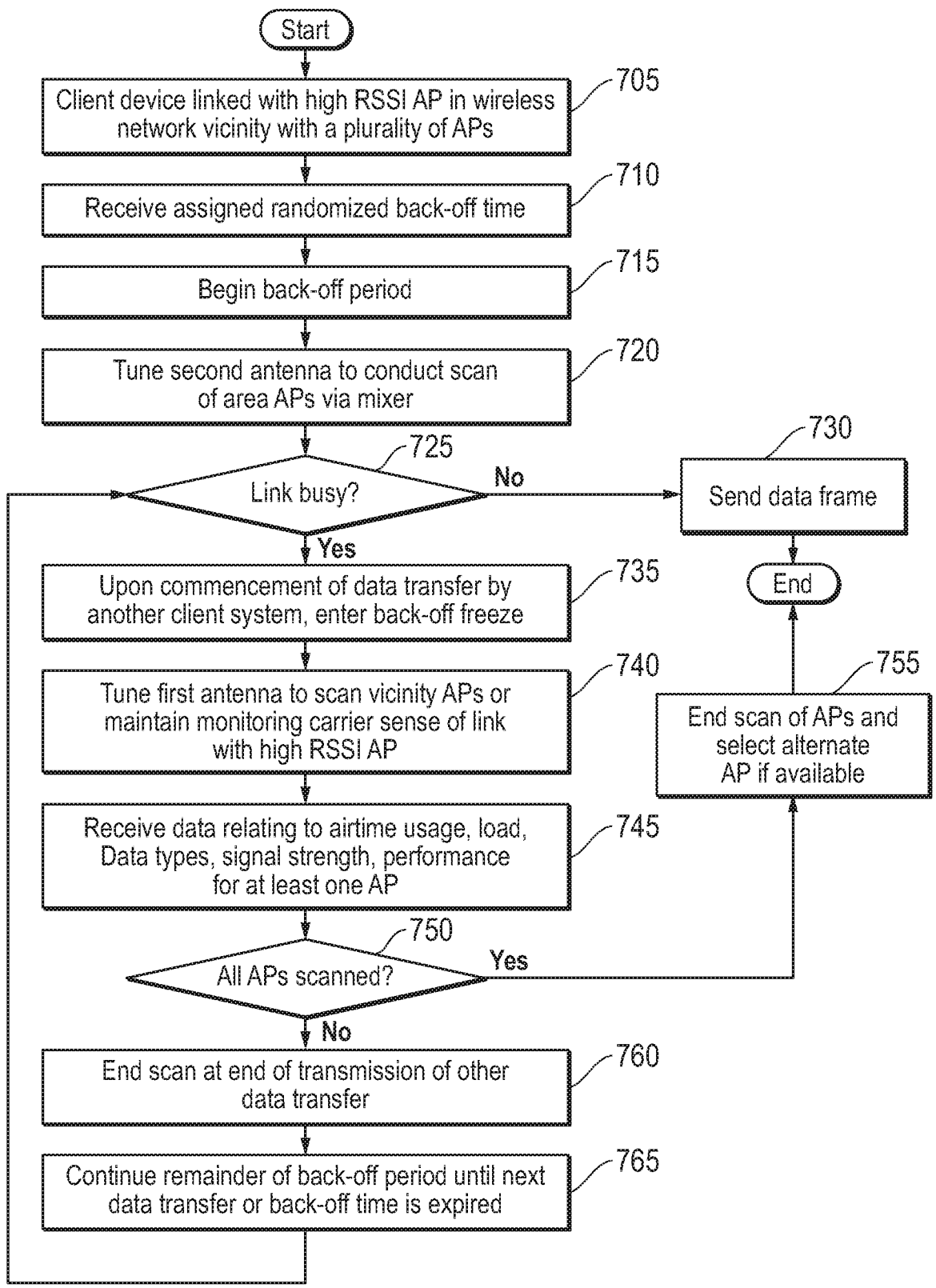
FIG. 7 is a flow diagram illustrating a method of evaluating wireless network BTSs with an intelligent wireless network evaluation scheduling system according to another embodiment of the present disclosure.

FIG. 7 illustrates a method for execution of code instructions for an intelligent wireless network evaluation scheduling system according to another embodiment herein. In such an embodiment, at least one client wireless information handling system may execute the intelligent wireless network evaluation scheduling system and to assess alternate BTSs within wireless range. The at least one client wireless information handling system of the embodiment of FIG. 7 may have a mixer such as shown and described in FIG. 6A or FIG. 6B. The second antenna, as in FIG. 6A, or both the first and second antennas, as in FIG. 6B, of the at least one client wireless information handling system may be directed by the intelligent wireless network evaluation scheduling system to conduct scanning. The scanning may occur during varied durations of a tune out period as shown in FIG. 6C, and scanning duration may vary between the first and second antennas in at least one embodiment.

The method starts at 705, where at least one client wireless information handling system links with a BTS, such as a Wi-Fi AP, having a high RSSI level. While RSSI levels are utilized in the current example embodiment, one or more KPI indicators may be used for determining QoS levels of links with BTSs in various embodiments. At 705, a plurality of other client wireless information handling systems may also link with the same BTS on the basis of the high RSSI value in an example embodiment. In an embodiment, this may cause congestion at the selected BTS with a high RSSI level as described herein. Further, there may be a plurality of BTSs, such as a plurality of Wi-Fi access points, available in the wireless neighborhood of the at least one client wireless information handling system as alternate, candidate BTSs for establishing wireless links. The intelligent wireless network evaluation scheduling system and intelligent background scanning for evaluation of other BTSs may not occur unless congestion is experienced at the selected BTS above. Upon experiencing congestion, back off and defer periods provide the opportunity for the intelligent wireless network evaluation scheduling system to scan and evaluate other neighborhood BTSs according to embodiments herein. As such, the intelligent wireless network evaluation scheduling system may continue to implement evaluation of wireless neighborhood BTSs in real time when congestion is experienced at a currently selected BTS. Real time data may change constantly with respect to conditions or available BTSs in a wireless neighborhood. Accordingly, the intelligent wireless network evaluation scheduling system may dynamically continue seeking improved BTS options when congestion is encountered on a selected BTS wireless link.

Proceeding to 710, the CSMA-CA IEEE 802.11 protocol may have assigned a random back-off time. Some client wireless devices may have a carryover remainder back off time. The CSMA-CA protocol may also assign additional random back off times to other client wireless information handling systems seeking to access the selected BTS in the wireless neighborhood. In an embodiment, any collision caused by identically-assigned random back off periods will trigger an error and reset of assignment of random back off periods. For purposes of this discussion, it is assumed that no identical random back off periods have been assigned.

As the data frame time periods progress for the selected, high-RSSI BTS, the back off time period will begin at 715. As described above with reference to FIG. 6C, the random back off period begins after the previous DIFS period has expired. The DIFS indicates the previous data frame period has ended. The commencement of the back off time countdown begins at the present data frame period. In the current embodiment, the at least one client wireless information handling system has a mixer providing for directing the first and second antennas separately. The client wireless information handling systems begin a tune out period at the beginning of the back off time countdown.

At 720, the mixer provides for the intelligent wireless network evaluation scheduling system to direct at least the second antenna of a client wireless information handling systems to conduct scanning during tune out time corresponding to the back off time countdown. The scanning modem may conduct scanning, via the second antenna of alternate, candidate BTSs within the wireless neighborhood while the first antenna continues listening to see if the wireless link channel is occupied.

Proceeding to 725, as the back off time period passes, the at least one client information handling system will utilize a carrier sense mechanism via the first antenna system to detect whether the channel link to the selected high RSSI BTS is busy.

At 725 the intelligent wireless network evaluation scheduling system determines whether the channel link to the selected high RSSI BTS is occupied. If not occupied at the end of the assigned back off time for the client wireless information handling systems or any remainder carrying over from a previous data frame period, then flow proceeds to 730. At 730, upon expiration of the assigned back off time or any remainder of the same, this indicates that the at least one client wireless information handling system had the shortest remaining back off time. In such a circumstance, the at least one client wireless information handling system is clear to begin transmitting a data frame. The second antenna may be directed, via the mixer system, back to the selected, high-RSSI BTS. Both the first and second antenna systems may conduct data frame transfer to enhance throughput. At that point, the flow may end.

If at 725 the channel link with the selected high RSSI BTS is determined to be occupied at any point before the back of time expires, one of the other client wireless information handling systems is taking a turn accessing the selected high RSSI BTS. That other client wireless device had a shorter assigned back off time. Then the other client wireless information handling system becomes a transmitting client device for the next data frame transmission on the channel link to the selected high RSSI BTS. In such a scenario, flow proceeds to 735. At 735, the at least one client information handling system enters a back-off freeze period during which the back off time remainder is deferred to the next data frame time period. The at least one client information handling system defers to the other transmitting client device on the channel link and enters a second phase of a tune out time upon the back-off freeze.

At 740, the intelligent wireless network evaluation scheduling system determines the second phase of the tune out time has commenced. In one embodiment, the intelligent wireless network evaluation scheduling system may direct the first antenna of the at least one client wireless information handing system to also scan vicinity BTSs. A scanning modem may be utilized with both antenna systems at the second phase of the tune out time to scan area BTS systems channel by channel.

At 745, the intelligent wireless network evaluation scheduling system conducting the scans of area BTSs in the wireless neighborhood receives data relating a different KPI such as for congestion, as well as the QoS metrics for channels to link with those alternate BTSs. For example, scans may provide data relating to load, signal strength, jitter, throughput, latency, or QoS metrics for other various KPIs or wireless metrics in some embodiments. In other examples, airtime usage, data types transferred, performance, available channels, conflicting bands in the area and other information related to each BTS evaluated may be determined.

Flow may proceed to 750 where the intelligent wireless network evaluation scheduling system will determine if all potential alternative BTSs in the wireless neighborhood have been evaluated. If so, flow may proceed to 755. When all potential alternative BTSs within scanning range of the wireless adapter of the at least one information handling system have been scanned, the scanning ends at 755. The intelligent wireless network evaluation scheduling system may then determine from among the alternative candidate BTS systems which may provide the lowest congestion or improved BTS data traffic levels or airtime availability in one embodiment. In another embodiment, a BTS rating may combine a determination of a best QoS connection which also has low congestion or improved BTS data traffic levels or airtime usage based on one or more different KPIs. In yet another embodiment, a threshold QoS metric level must be met first and then a BTS with improved BTS data traffic levels may be selected based on a different KPI. The intelligent wireless network evaluation scheduling system may, upon any such criteria above, select an alternative candidate BTS as a better option than the currently-selected high RSSI BTS. In one embodiment, the options of one or more alternative candidate BTS systems may be presented to a user via a display screen option suggesting a change in BTS. For example, a user interface window may pop-up recommending a change. In another embodiment, the at least one client wireless information handling system may automatically select the best alternative candidate BTS system and switch wireless linking to that alternative. For example, if the signal strength is above a threshold level for an alternative candidate BTS, a low congestion option meeting that minimal QoS threshold may be selected and the wireless link switched there. In other embodiments, a blend of QoS level and low congestion level may be used to select the alternative BTS for establishing a new wireless link. At this point, the flow may end.

If not all BTSs in a wireless neighborhood have been scanned at 755, then flow proceeds to 760. At 760, the intelligent wireless network evaluation scheduling system may conduct scanning with one or both of the antennas of the at least one client wireless information handling system until the ongoing data transmission of the current data frame period has ended. This may be indicated by a DIFS period. In one optional embodiment where only the second antenna is diverted to conduct the scanning of alternate BTS options, that second antenna may continue scanning in a DIFS period. In another example embodiment, both the second antenna and the first antenna may stop scanning alternate BTS options within a wireless neighborhood at the next DIFS. Upon commencement of the next DIFS indicating that the ongoing data transmission ended, the first antenna may be directed to listen for channel occupancy on the wireless link with the selected, high-RSSI BTS. The tune out time for both the first and second antennas ends and the scanning may end on one embodiment until the next tune out time.

At 765, the CSMA-CA protocol will continue after the next DIFS. After the DIFS, a new back-off period will begin for the next data frame period and any remainder back off time will be continued there. Competing client wireless information handling systems seeking to wirelessly transmit data to the selected high-RSSI BTS will continue to countdown their assigned remaining back-off period duration. This back-off period countdown will continue until the next shortest assigned back-off time expires and that client wireless device begins transmission of data to occupy the link. During this back-off countdown period, the next tune out time will commence and the second antenna system of the client wireless information handling system may continue scanning. Flow will return to 725 to determine if the wireless link with the selected high-RSSI BTS is busy with another data transmission from a different client wireless device. If the at least one client wireless information handling system operating the intelligent wireless network evaluation scheduling system of the current method has the shortest remaining back-off time, then data transmission will commence at 730 and further scanning is not conducted. In that case, the tune out time for the client wireless information handling system is abbreviated and both antennas may be directed by the intelligent wireless network evaluation scheduling system to transmit a data frame.

If the at least one client information handling system does not have the shortest remaining back-off time at 725, then scanning of vicinity BTSs in the wireless neighborhood will continue according to the various embodiments described herein. In one embodiment, similar to FIG. 6A, the second antenna will continue scanning. In other embodiments such as FIG. 6B, the first antenna may also be directed to conduct scanning after the back-off freeze. The method may end when all BTS systems are scanned or a data frame is transmitted in some aspects. It is contemplated, however, that the method the embodiments of FIG. 6A or 6B and of FIG. 7 may be conducted continually, periodically, episodically, or pursuant to a trigger such as a detected delay threshold in wireless data transmission or a detected congestion level at a BTS. It may be appreciated that such a method may be conducted under any combination of such circumstances.

It is understood that the methods and concepts described in the algorithm above for FIGS. 5 and 7 may be performed in any sequence or steps may be performed simultaneously in some embodiments. It is also understood that in some varied embodiments certain steps may not be performed at all or additional steps not recited in the above figures may be performed. It is also contemplated that variations on the methods described herein may also be combined with portions of any other embodiments in the present disclosure to form a variety of additional embodiments. For example, aspects of the various embodiments of several figures herein may be modified as understood by those of skill to implement variations described from each of those embodiments to the methods of FIG. 5 or FIG. 7 or those described in other embodiments herein.

In some embodiments, dedicated hardware implementations such as application specific integrated circuits, programmable logic arrays and other hardware devices can be constructed to implement one or more of the methods described herein or portions of one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as an Intel® Core™ or ARM® RISC brand processors, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a wireless interface for transmitting a data frame via a wireless link to a first wireless base transceiver station (BTS) in a wireless neighborhood having a plurality of wireless BTSs within communication range of the wireless interface;
   a plurality of antenna systems operating via the wireless interface executing code instructions for a carrier sense multiple access (CSMA) media access control protocol employing back-off time periods to avoid packet collision;
   the wireless interface detecting carrier frequency operation by a carrier sense mechanism indicating transmission is busy on the wireless link with the first BTS from another device;
   a radio scanning modem for scanning a plurality of radio channels for alternative BTSs operating in the wireless neighborhood via the plurality of antenna systems during a tune out time beginning upon the detection of the carrier frequency operation by the carrier sense mechanism indicating transmission is busy on the wireless link from another device and ending at a next distributed inter-frame space period of the CSMA protocol;
   a processor implementing a network evaluation scheduling system for detecting alternative BTS key performance indicator (KPI) for each detected, alternative BTS operating in the wireless neighborhood during the tune out time and determining alternative wireless links with the alternative BTSs based on a different KPI; and
   the wireless interface transmitting a data frame to the first BTS upon expiration of a back-off period assigned to the information handling system and detection of no carrier frequency by the carrier sense mechanism.

2. The system of claim 1, wherein the wireless link operates on a WLAN wireless link protocol and the BTSs are a plurality of WLAN access points (APs) in the wireless neighborhood.

3. The system of claim 1, wherein the carrier sense mechanism is a radio listening for wireless signals in the shared frequency band of a wireless network serviced by a BTS.

4. The system of claim 1 further comprising:
the radio scanning modem scanning the plurality of radio channels for the alternative BTSs operating in the wireless neighborhood during plural tune out periods for consecutive data frame transmission periods until all alternative BTSs in the wireless neighborhood have been scanned.

5. The system of claim 4, wherein the CSMA media access control protocol is a CSMA collision avoidance protocol for use with Wi-Fi network systems managing multiple client access attempts at the first BTS.

6. The system of claim 1 further comprising:
the processor executing code instructions of the network evaluation scheduling system to select one alternative BTS in the wireless neighborhood having the different KPI indicating a lower BTS data traffic levels determined from load, throughput, latency, or airtime usage than the wireless link with the first BTS.

7. The system of claim 1, wherein the network evaluation scheduling system determines a ranked plurality of the alternative BTS systems and the first BTS system in the wireless neighborhood based on the different KPI indicating BTS data traffic levels determined from load, throughput, latency, or airtime usage.

8. The system of claim 1 further comprising:
wireless interface transmitting a data frame after expiration of the back-off period and upon exchange of a request to send packet and clear to send packets with the first BTS hosting the wireless link.

9. A computer implemented method comprising:
interfacing with a wireless link with a first base transceiver station (BTS) in a wireless neighborhood for transmitting a data frame via a wireless interface, wherein the wireless neighborhood has a plurality of BTSs within communication range of a first antenna system and a second antenna system on an information handling system;
monitoring a current channel of the wireless link with the first BTS using the first antenna system;
executing code instructions for a carrier sense multiple access (CSMA) media access control protocol employing back-off time periods to avoid packet collision via the wireless interface;
detecting carrier frequency operation by a carrier sense mechanism indicating transmission is busy on the wireless link with the first BTS from another device;
scanning a plurality of radio channels for alternative BTSs operating in the wireless neighborhood via a radio scanning modem operating on the second antenna system during a second antenna tune out period commencing upon detection of the carrier frequency operation by the carrier sense mechanism indicating transmission is busy on the wireless link with the first BTS from another client device in the wireless neighborhood and ending at a next distributed inter-frame space period of the CSMA protocol;

detecting a BTS key performance indicator (KPI) for each detected, alternative BTS operating in the wireless neighborhood and determining a KPI for alternative wireless links with the alternative BTSs; and
transmitting a data frame to the first BTS upon expiration of a back-off period assigned to the information handling system and detection of no carrier frequency by the carrier sense mechanism operating on the first antenna system and the second antenna system.

10. The method of claim 9 further comprising:
scanning the plurality of radio channels for the alternative BTSs operating in the wireless neighborhood via the radio scanning modem operating on the first antenna system during a first antenna tune out period commencing upon detection of carrier frequency operation indicating transmission is busy on the wireless link with the first BTS from another client device in the wireless neighborhood and ending at the next distributed inter-frame space period of the CSMA protocol.

11. The method of claim 9 further comprising:
selecting an alternative BTS in the wireless neighborhood where the alternative wireless link KPI indicates a lower BTS data traffic levels determined from load, throughput, latency, or airtime usage than the first wireless link with the first BTS.

12. The method of claim 9 further comprising:
directing, via a mixer for the second antenna, the second antenna system to interface with the radio scanning modem for scanning the plurality of radio channels for the alternative BTSs operating in the wireless neighborhood during a second antenna tune out period beginning at commencement of a back-off time period assigned to the information handling system and ending at the next distributed inter-frame space period of the CSMA protocol.

13. The method of claim 9 further comprising:
redirecting, via a mixer, the second antenna system to interface with the wireless interface to transmit the data frame to the first BTS upon expiration of the back-off period assigned to the information handling system and detection of no carrier frequency by the carrier sense mechanism.

14. The method of claim 9 further comprising:
scanning the plurality of radio channels for the alternative BTSs operating in the wireless neighborhood via the radio scanning modem during plural second antenna tune out periods for consecutive data frame transmission periods until all alternative BTSs in the wireless neighborhood have been scanned.

15. The method of claim 9, wherein the wireless link operates on a WLAN wireless link protocol and the BTSs are a plurality of WLAN access points (APs) in the wireless neighborhood.

16. An information handling system comprising:
a wireless interface for transmitting a data frame via a wireless link with a first base transceiver stations (BTS) in a wireless neighborhood having a plurality of BTSs within communication range of the wireless interface;
a first antenna system and a second antenna system operating via the wireless interface executing code instructions for a carrier sense multiple access (CSMA) media access control protocol employing back-off time periods to avoid packet collision;
the wireless interface detecting carrier frequency operation by a carrier sense mechanism indicating transmission is busy on the wireless link with the first BTS from another device;

a mixer directing the second antenna system to interface with a radio scanning modem for scanning a plurality of radio channels for alternative BTSs operating in the wireless neighborhood during a second antenna tune out time commencing at a back-off time period assigned to the information handling system and ending at a next distributed inter-frame space period of the CSMA protocol;

a processor executing code of a network evaluation scheduling system for detecting a BTS key performance indicator (KPI) for each detected, alternative BTS system operating in the wireless neighborhood and determining alternative wireless links with the alternative BTSs; and the wireless interface transmitting a data frame to the first BTS upon expiration of the back-off period assigned to the information handling system and detection of no carrier frequency by the carrier sense mechanism.

17. The system of claim 16, wherein the wireless link operates on a WLAN wireless link protocol and the BTSs are a plurality of WLAN access points (APs) in the wireless neighborhood.

18. The system of claim 16, wherein the mixer redirects the second antenna to transmit the data frame to the first BTS upon expiration of the back-off period assigned to the information handling system and detection of no carrier frequency by the carrier sense mechanism.

19. The system of claim 16 further comprising:

a second mixer directing the first antenna system to interface with the radio scanning modem for scanning the plurality of radio channels for the alternative BTSs operating in the wireless neighborhood along with the second of antenna systems upon detection of carrier frequency operation indicating transmission is busy on the wireless link with the first BTS from another device and ending at the next distributed inter-frame space period of the CSMA protocol.

20. The system of claim 16 further comprising:

the processor executing code instructions to select one of the alternative BTSs in the wireless neighborhood with the alternative BTS KPI indicating lower BTS data traffic levels determined from load, throughput, latency, or airtime usage than for the first BTS.

* * * * *